United States Patent
Nakamura

(10) Patent No.: US 7,424,204 B2
(45) Date of Patent: Sep. 9, 2008

(54) VIDEO INFORMATION SUMMARIZING APPARATUS AND METHOD FOR GENERATING DIGEST INFORMATION, AND VIDEO INFORMATION SUMMARIZING PROGRAM FOR GENERATING DIGEST INFORMATION

(75) Inventor: Takeshi Nakamura, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 1074 days.

(21) Appl. No.: 10/195,809

(22) Filed: Jul. 16, 2002

(65) Prior Publication Data

US 2003/0016945 A1 Jan. 23, 2003

(30) Foreign Application Priority Data

Jul. 17, 2001 (JP) ............................ P2001-216604
Sep. 28, 2001 (JP) ............................ P2001-304360

(51) Int. Cl.
*H04N 5/91* (2006.01)
*H04N 5/95* (2006.01)
*H04N 5/14* (2006.01)
*H04N 9/64* (2006.01)

(52) U.S. Cl. ............................ 386/95; 386/68; 386/69; 386/70; 348/700; 348/701

(58) Field of Classification Search ............. 386/68–70, 386/95; 348/700–701
See application file for complete search history.

(56) References Cited

U.S. PATENT DOCUMENTS 5,835,667 A 11/1998 Wactlar et al. ................ 386/96

| | | |
|---|---|---|
| 6,072,542 A | 6/2000 | Wilcox et al. ................ 348/722 |
| 6,160,950 A * | 12/2000 | Shimazaki et al. ............. 386/46 |
| 6,819,863 B2 * | 11/2004 | Dagtas et al. .................. 386/46 |

(Continued)

FOREIGN PATENT DOCUMENTS

EP    1 081 960 A1    3/2001

(Continued)

OTHER PUBLICATIONS

Zhang et al., "Automatic Partitioning of Full-Motion Video", Multimedia Systems, vol. 1, No. 1, pp. 10-28, (1993).

(Continued)

*Primary Examiner*—Thai Tran
*Assistant Examiner*—Daquan Zhao
(74) *Attorney, Agent, or Firm*—Drinker Biddle & Reath LLP

(57) ABSTRACT

A summary reproducing apparatus, which is capable of reproducing a summary accurately for each type of video information and of reducing a burden in generating digest information, provided with an audio feature amount extraction unit for obtaining a sound feature amount on the basis of a preset parameter from entered audio/video information, a genre information obtaining unit for obtaining genre information from additional information added to the entered audio/video information, a decision parameter setting unit for setting an optimum parameter for extracting a sound feature amount on the basis of genre information, and a control unit for deciding digest segments to be extracted in stored audio/video information on the basis of an audio feature amount suitable for the preset parameter and for controlling a reproduction unit on the basis of the digest segments, wherein a summary is reproduced by using a parameter optimized for each genre.

30 Claims, 7 Drawing Sheets

U.S. PATENT DOCUMENTS 6,993,248 B1 * 1/2006 Kato .......................... 386/69

FOREIGN PATENT DOCUMENTS

JP 09-219835 8/1997

OTHER PUBLICATIONS

Nam et al., "Combined Audio and Visual Streams Analysis For Video Sequence Segmentation", IEEE Acoustics, Speech, and Signal Processing, pp. 2665-2668, (1997).

Babaguchi et al., "Event Detection From Continuous Media", IEEE, pp. 1209-1212, (1998).

Lienhart et al., "Scene Determination Based on Video and Audio Features", IEEE, pp. 685-690, (1999).

Zhang et al., "Audi-Guided Audiovisual Data Segmentation, Indexing, and Retrieval", SPIE, vol. 3656, Jan. 1999, pp. 316-327.

Y. Wang et al., "Multimedia Content Analysis: Using Both Audio and Visual Clues," IEEE Signal Processing Magazine, Nov. 2000, pp. 12-36.

* cited by examiner

VIDEO INFORMATION SUMMARIZING APPARATUS AND METHOD FOR GENERATING DIGEST INFORMATION, AND VIDEO INFORMATION SUMMARIZING PROGRAM FOR GENERATING DIGEST INFORMATION

BACKGROUND OF THE INVENTION

1. Field of the Invention

The present invention relates to the technical field of apparatuses for reproducing a summary of video information to which sound is added. More particularly, it relates to the technical field for decision of partial video information to be extracted based on the level of the sound.

2. Related Background Art

As recording apparatuses such as VTRs (Video Tape Recorder) for recording and reproducing video information like a television broadcasting program have recently become widespread, digest reproduction (summary reproduction) has been in practical use. The summary reproduction provides a quick sight of video information summarized in short time to eliminate the need to view all the recorded video information.

On the other hand, there could be various types of video information such as, for example, a movie, a news program, a popular song program, and a sport-watching program in a large variety of genres provided on television. For this reason, feature parts of partial video information to be extracted in summarizing in short time according to a type of video information do not coincide with each other, by which there is a need for obtaining information on the type of video information in order to extract the feature parts thereof accurately.

In other words, an exciting part is a feature part of the video information in a sport-watching program and thus the exciting part needs to be extracted precisely, or the beginning of each news includes an outline of the next news in a news program and thus a news content change part needs to be extracted accurately.

Conventionally there is known a video information summarizing apparatus disclosed in Japanese Unexamined Patent Publication No. 9-219835 as a typical one for reproducing a summary with identifying the video types.

As shown in FIG. 7, a video information summarizing apparatus 1 described in the publication is provided with: a video information input unit 2 for digitizing or decoding inputted video information; a genre information obtaining unit 3 for identifying a video information type from video information outputted from the video information input unit 2; a video section management unit 4 for managing video sections by video types as attributes; a pixel generation unit 5 for generating typical pixels of the video information and its partial sections according to a video type; a layout unit 6 for making a spatial and temporal layout of the typical pixels generated by the pixel generation unit 5 to generate digest video information; and a display unit 7 for displaying the generated video information, so that efficient digest video information can be generated for each type of video information.

In the above-mentioned summary reproducing method, however, there is a problem that a different process must be performed for each type of video information in generating digest video information. In other words, the above-mentioned summary reproducing method has a problem that a different procedure is used for generating typical pixels necessary for summary reproduction for each type of video information such as a news program or a movie to generate digest video information, thereby increasing a processing burden in the process for generating the digest video information and complicating the generation process.

SUMMARY OF THE INVENTION

The present invention has been made in consideration of the above problem, and it is an object thereof to provide a digest information apparatus capable of reproducing a summary accurately for each type of video information and of reducing a burden in generating digest information.

The above object of the present invention can be achieved by a video information summarizing apparatus of the present invention for extracting one or more pieces of partial video information as some parts of video information from content information made of audio information and the video information and for generating digest information having a shorter time length of the video information on the basis of the partial video information extracted. The apparatus is provided with: an obtaining device which obtains identification information for identifying a type of the content information; a decision device which classifies the content information into a plurality of content sections by using optimized thresholds and which decides the partial video information to be extracted on the basis of the classified content section; an optimization device which sets optimum values to one or a plurality of the thresholds used for classifying the content information into the plurality of content sections on the basis of the obtained identification information; and a generation device which generates the digest information by extracting the decided partial video information from the video information.

According to the present invention, an obtaining device obtains identification information for identifying a type of content information, an optimization device sets optimum values to one or more thresholds in the video information on the basis of the identification information, a decision device classifies the content information into a plurality of content sections by using the optimized thresholds and decides partial video information to be extracted on the basis of the classified content section concerned, and a generation device generates digest information on the basis of the decided partial video information.

In general, a feature of video information contained in content information (the content information includes at least video information and in some cases includes audio information or data information besides the video information; hereinafter, it is the same) depends upon a genre of a TV or other program.

For example, a news program has a so-called scene change part between news pieces. In other words, in the news program, the scene change part indicates a part where a scene is changed over or a part where contents are switched and a part that follows the scene change part shows the beginning of the next contents, especially, often shows an outline of the contents concerned, which indicates a feature part of the content information.

In addition, in video information added to the content information concerned such as a sport-watching program, an exciting part of the contents often causes frequent scene changes and therefore intervals of the scene changes indicate feature parts of the content information.

In this manner, characteristics of the video information contained in the content information concerned depend upon a type of the content information.

Accordingly, in the present invention, thresholds in classifying a plurality of content sections used as reference to the decision of the partial video information can be optimized on the basis of the identification information in the content information, thereby enabling an accurate extraction of the partial video information to be extracted even for a different type of content information so as to obtain digest information based on the contents of the video information.

Further, the partial video information to be extracted can be extracted accurately only by optimizing the thresholds, thereby enabling an easy decision of the partial video information without a need for changing a processing operation of the partial video information for each type of content information.

The above object of the present invention can be achieved by a video information summarizing apparatus of the present invention for extracting one or more pieces of partial video information as some parts of video information from the video information to which audio information is added on the basis of the audio information and for generating digest information having a shorter time length of the video information on the basis of the partial video information extracted. The apparatus is provided with: an obtaining device which obtains identification information for identifying a type of video information externally; a decision device which classifies the audio information added to the video information into a plurality of audio sections by using optimized thresholds and which decides the partial video information to be extracted on the basis of the classified audio sections; an optimization device which sets optimum values to one or a plurality of thresholds used for classifying the audio information into the plurality of audio sections on the basis of the obtained identification information; and a generation device which generates the digest information by extracting the decided partial video information from the video information.

According to the present invention, an obtaining device obtains identification information for identifying a type of video information, an optimization device sets optimum values to one or more thresholds in the audio information on the basis of the identification information, a decision device classifies the video information into a plurality of audio sections by the optimized thresholds and decides partial video information to be extracted on the basis of the classified audio sections concerned, and a generation device generates digest information on the basis of the decided partial video information.

In general, a feature of the audio information added to the video information depends upon a genre of a TV or other program.

For example, a news program has a silent part between news pieces. In other words, in the news program, the silent part indicates a part where a scene is changed over or a part where contents are switched and a part that follows the silent part shows the beginning of the next contents, especially, often shows an outline of the contents concerned, which indicates a feature part of the video information.

In addition, in video information having cheer sounds in background noise forming the audio information added to the video information concerned such as a sport-watching program, the cheer sounds in the audio information will be extremely high in audio level in the exciting part of the contents and therefore the audio level of the cheer sounds indicates a feature part of the video information. Further, a sport program has no or very little silent part while always having cheer sounds in background noise, and therefore there is a need for setting a higher value to a threshold of a audio section indicating an exciting part of the contents than that to other video information.

In this manner, sound characteristics of the audio information added to the video information concerned depend upon a type of the video information.

Accordingly, in the present invention, thresholds in classifying a plurality of audio sections used as reference to the decision of partial video information can be optimized on the basis of the identification information in the video information, thereby enabling an accurate extraction of the partial video information to be extracted even for a different type of video information so as to obtain digest information based on the contents of the video information.

Further, the partial video information to be extracted can be extracted accurately only by optimizing the thresholds, thereby enabling an easy decision of the partial video information without a need for changing a processing operation of the partial video information for each type of video information.

In one aspect of the present invention, the decision device decides the partial video information to be extracted on the basis of at least a time-base position of at least any one of the plural types of classified audio sections.

According to this aspect, preferably the decision device decides the partial video information to be extracted on the basis of at least a time-base position of at least any one of the plural types of audio sections classified in the video information.

In general, since the audio information added to the video information shows feature parts such as exciting parts of a program, scene change parts, and parts where contents are switched, it plays an important role in summarizing the video information in shorter time.

For example, a part that follows a silent part in the video information to which the audio information is added shows the beginning of the next contents, especially, often shows an outline of the contents concerned, and therefore the end position on the time axis of the silent part is an important part in grasping the contents of the video information. In addition, a noise part containing loud voices in the video information also becomes a feature part, and therefore the start position of the noise part becomes an important part in grasping the contents of the video information.

Accordingly, in the present invention, it is possible to decide partial video information to be extracted on the basis of at least the time-base position of at least any one of the plural types of audio sections classified in the video information, thereby enabling an accurate extraction of the exciting part of the video information and the content change part as partial video information and obtaining digest information based on the contents of the video information.

In another aspect of the present invention, if the identification information shows an identification of video information having silent parts, the decision device obtains the silent sections at least partially having the silent parts by classifying the audio information and decides the partial video information at least on the basis of the silent sections, and the optimization device optimizes the thresholds used when the decision device obtains the silent sections.

In the configuration, preferably, if the identification information obtained by the obtaining device shows an identification of video information having silent parts, the optimization device optimizes the thresholds used when the decision device obtains silent sections and the decision device obtains the silent sections from the audio information on the basis of the optimized thresholds to decide the partial video information to be extracted.

The sound characteristics in the video information depend upon a type of the video information concerned. Additionally, in the video information having silent parts, it is important to detect the silent parts accurately when extracting the feature part.

Therefore, in the present invention, if the identification information of the video information shows an identification of video information having silent parts such as a news program, silent sections having silent parts can be obtained accurately by using appropriate thresholds for the video information, thereby enabling a user to obtain digest information based on the contents of the video information.

In further aspect of the present invention, if the obtained identification information shows an identification of video information having cheer sounds in background noise forming the audio information, the decision device obtains the cheer sound sections having the cheer sounds by classifying the audio information and decides the partial video information at least on the basis of the cheer sound sections, and the optimization device optimizes the thresholds used when the decision device obtains the cheer sound sections.

According to this aspect, preferably, if the identification information obtained by the obtaining device shows an identification of video information having cheer sounds in background noise forming the audio information, the optimization device optimizes the thresholds used when the decision device obtains cheer sound sections and the decision device obtains the cheer sound sections from the audio information on the basis of the optimized thresholds to decide the partial video information to be extracted.

The sound characteristics in the video information depend upon a type of the video information concerned. Additionally, in the video information having cheer sounds in background noise forming the audio information added to the video information concerned, it is important to detect the cheer sound sections accurately when extracting the feature part.

Therefore, in the present invention, if the identification information of the video information shows an identification of video information having cheer sounds in background noise such as a sport-watching program, cheer sound sections can be detected accurately by using optimized thresholds for the video information, thereby enabling a user to obtain digest information based on the contents of the video information.

The above object of the present invention can be achieved by a video information summarizing apparatus of the present invention for extracting one or more pieces of partial video information as some parts of video information from content information made of audio information and the video information and for generating digest information having a shorter time length of the video information on the basis of the partial video information extracted and importance. The apparatus is provided with: an obtaining device which obtains identification information for identifying a type of the content information; a decision device which classifies the content information into a plurality of content sections on the basis of thresholds in the content information and which decides the partial video information to be extracted on the basis of the classified content sections; an optimization device which optimizes the importance set to each of the partial video information on the basis of the obtained identification information; a setting device which sets the optimized importance to each of the partial video information; and a generation device which generates the digest information by extracting the decided partial video information from the video information on the basis of the importance.

According to the present invention, an obtaining device obtains identification information for identifying a type of content information, a decision device classifies the content information into a plurality of content sections on the basis of thresholds to decide partial video information to be extracted, an optimization device optimizes importance set to each partial video information on the basis of the obtained identification information, a setting device sets the optimized importance to the partial video information, and a generation device generates digest information on the basis of the decided partial video information and importance.

In general, a feature of the video information added to the content information depends upon a genre of a TV or other program.

For example, a news program has a scene change part between news pieces. In other words, in the news program, the scene change part indicates a part where a scene is changed over or a part where contents are switched and a part that follows the scene change part shows the beginning of the next contents, especially, often shows an outline of the contents concerned, which indicates a feature part of the content information. Therefore, this part is very important in comparison with sections other than the scene change sections.

In addition, in video information added to the content information concerned such as a sport-watching program, an exciting part of the contents often causes frequent scene changes and therefore intervals of the scene changes indicate feature parts of the content information.

In this manner, characteristics of the video information contained in the content information concerned depend upon a type of the content information.

Accordingly, in the present invention, the importance in generating the digest information on the basis of the partial video information can be optimized on the basis of the identification information in the content information, thereby enabling an accurate extraction of the partial video information to be extracted even for a different type of content information so as to obtain digest information based on the contents of the content information.

The above object of the present invention can be achieved by a video information summarizing apparatus of the present invention for extracting one or more pieces of partial video information as some parts of video information from the video information to which audio information is added on the basis of the audio information and for generating digest information having a shorter time length of the video information on the basis of the partial video information extracted and importance. The apparatus is provided with: an obtaining device which obtains identification information for identifying a type of the video information; a decision device which classifies the video information into a plurality of audio sections on the basis of thresholds in the audio information and which decides the partial video information to be extracted on the basis of the classified sections; an optimization device which optimizes the importance set to each of the partial video information on the basis of the obtained identification information; a setting device which sets the optimized importance to each of the partial video information; and a generation device which generates the digest information by extracting the decided partial video information from the video information on the basis of the importance.

According to the present invention, an obtaining device obtains identification information for identifying a type of video information, a decision device classifies the video information into a plurality of audio sections on the basis of thresholds to decide partial video information to be extracted, an optimization device optimizes the importance set to the partial video information on the basis of the obtained identification information, a setting device sets the optimized importance to the partial video information, and a generation device generates digest information on the basis of the decided partial video information and importance.

In general, a feature of the audio information added to the video information depends upon a genre of a TV or other program.

For example, a news program has a silent part between news pieces. In other words, in the news program, the silent part indicates a part where a scene is changed over or a part where contents are switched and a part that follows the silent part shows the beginning of the next contents, especially, often shows an outline of the contents concerned, which indicates a feature part of the video information. Therefore, this part is very important in comparison with other audio sections such as noise sections.

In addition, in video information having cheer sounds in background noise forming the audio information added to the video information concerned such as a sport-watching program, the cheer sounds in the audio information will be extremely high in sound level in exciting parts of the program contents, by which the sound level of the cheer sounds indicates a feature part of the video information. Further, a sport-watching program has no or very little silent part while always having cheer sounds in background noise, and therefore there is a need for setting a higher value to a threshold of an audio section indicating an exciting part of the contents than that to other video information and a need for changing settings of the importance in summary reproduction according to a section used as reference when the summary is reproduced by extracting the exciting contents accurately.

In this manner, sound characteristics of the audio information added to the video information concerned depend upon a type of the video information.

Accordingly, in the present invention, the importance in generating the digest information based on the partial video information can be optimized on the basis of the identification information in the video information, thereby enabling an accurate extraction of the partial video information to be extracted even for a different type of video information so as to obtain digest information based on the contents of the video information.

In one aspect of the present invention, if the decision device decides the partial video information to be extracted on the basis of different thresholds, the optimization device optimizes the importance for each of the different thresholds on the basis of the obtained identification information, and the setting device sets the optimized importance to the partial video information.

According to this aspect, preferably, if the decision device decides the partial video information to be extracted on the basis of the different thresholds, the setting device sets the importance optimized on the basis of the identification information obtained for each of the different thresholds to each partial video information decided.

Sound characteristics added to the video information depend upon a type of the video information and importance of the audio section varies according to video information for which summary reproduction is conducted. Especially, in video information having silent sections such as a news program, more importance is given to the silent sections than that to sections having higher sound levels. Additionally, in video information having cheer sounds in background noise forming the audio information added to the video information concerned such as a sport-watching program, more importance is given to sections having higher sound levels than that to silent sections. If partial video information is decided based on a plurality of sound levels, the importance in summary reproduction varies according to different sound levels.

Accordingly, in the present invention, the importance in generating the digest information based on the partial video information can be optimized on the basis of the identification information in the video information and the importance optimized for each of the different audio sections can be set to each partial video information, thereby enabling an accurate extraction of the partial video information to be extracted even for a different type of video information so as to obtain digest information based on the contents of the video information.

In another aspect of the present invention, if the obtained identification information shows an identification of video information having silent parts, the decision device obtains silent sections at least partially having silent parts by classifying the audio information and decides the partial video information at least on the basis of the silent sections, and the optimization device optimizes the importance set to the partial video information decided based on the silent sections.

According to this aspect, preferably, if the obtained identification information shows an identification of video information having silent parts, the decision device obtains silent sections at least partially having silent parts by classifying the audio information and decides partial video information on the basis of the silent sections concerned and the optimization device optimizes the importance set to the partial video information decided based on the silent sections.

Sound characteristics in the video information depend upon a type of the video information concerned and it is important to reproduce the silent parts accurately in summary reproduction in the video information having silent parts.

Accordingly, in the present invention, if the identification information of the video information shows an identification of video information having silent parts such as a news program, it is possible to optimize the importance of partial video information decided based on sections having silent parts, thereby enabling an accurate extraction of the partial video information to be extracted so as to obtain digest information based on the contents of the video information.

In further aspect of the present invention, if the obtained identification information shows an identification of video information having cheer sounds in background noise forming the audio information, the decision device obtains cheer sound sections having the cheer sounds by classifying the audio information and decides the partial video information at least on the basis of the cheer sound sections, and the optimization device optimizes the importance set to the partial video information set based on the cheer sound sections.

In the configuration, preferably, if the obtained identification information shows an identification of video information having cheer sounds in background noise forming the audio information, the decision device obtains cheer sound sections having the cheer sounds by classifying the audio sections and decides the partial video information on the basis of the cheer sound sections concerned and the optimization device optimizes the importance set to the partial video information decided based on the cheer sound sections.

Sound characteristics in the video information depend upon a type of the video information concerned and it is important to reproduce the sections having loud cheer sounds accurately in summary reproduction in the video information having cheer sounds in background noise forming the audio information.

Accordingly, in the present invention, if the identification information of the video information shows an identification of video information having cheer sounds in background noise forming the audio information, it is possible to optimize the importance of partial video information decided based on sections having cheer sounds, thereby enabling an accurate extraction of the partial video information to be extracted so as to obtain digest information based on the contents of the video information.

The above object of the present invention can be achieved by a video information summarizing method of the present invention for extracting one or more pieces of partial video information as some parts of video information from content information made of audio information and the video information and for generating digest information having a shorter time length of the video information on the basis of the partial video information extracted. The method is provided with: an obtaining process for obtaining identification information for identifying a type of the content information; a decision process for classifying the content information into a plurality of content sections by using optimized thresholds and for deciding the partial video information to be extracted on the basis of the classified content sections; an optimization process for setting optimum values to the one or more thresholds used for classifying the content information into the plurality of content sections on the basis of the obtained identification information; and a generation process for extracting the decided partial video information from the video information to generate the digest information.

According to the present invention, an obtaining process is to obtain identification information for identifying a type of content information, an optimization process is to set optimum values to one or more thresholds in the video information on the basis of the identification information, a decision process is to classify the content information into a plurality of content sections by the optimized thresholds and to decide the partial video information to be extracted on the basis of the classified content sections concerned, and a generation process is to generate the digest information on the basis of the decided partial video information.

In general, a feature of the video information contained in the content information depends upon a genre of a TV or other program.

For example, a news program has a so-called scene change part between news pieces. In other words, in the news program, the scene change part indicates a part where a scene is changed over or a part where contents are switched and a part that follows the scene change part shows the beginning of the next contents, especially, often shows an outline of the contents concerned, which indicates a feature part of the content information.

In addition, in video information added to the content information concerned such as a sport-watching program, an exciting part of the contents often causes frequent scene changes and therefore intervals of the scene changes indicate feature parts of the content information.

In this manner, characteristics of the video information contained in the content information concerned depend upon a type of the content information.

Accordingly, in the present invention, thresholds in classifying a plurality of content sections used as reference to the decision of partial video information can be optimized on the basis of the identification information in the content information, thereby enabling an accurate extraction of the partial video information to be extracted even for a different type of content information so as to obtain digest information based on the contents of the content information.

Further, the partial video information to be extracted can be extracted accurately only by optimizing the thresholds, thereby enabling an easy decision of the partial video information without a need for changing a processing operation of the partial video information for each type of content information.

The above object of the present invention can be achieved by a video information summarizing method of the present invention for extracting one or more pieces of partial video information as some parts of video information from the video information to which audio information is added on the basis of the audio information and for generating digest information having a shorter time length of the video information on the basis of the partial video information extracted. The method is provided with: an obtaining process for obtaining identification information for identifying a type of the video information; a decision process for classifying the audio information added to the video information into a plurality of audio sections by using optimized thresholds and for deciding the partial video information to be extracted on the basis of the classified audio sections; an optimization process for setting optimum values to the one or more thresholds used for classifying the audio information into the plurality of audio sections on the basis of the obtained identification information; and a generation process for extracting the decided partial video information from the video information to generate the digest information.

According to the present invention, an obtaining process is to obtain identification information for identifying a type of video information, an optimization process is to set optimum values to one or more thresholds in the audio information on the basis of the identification information, a decision process is to classify the video information into a plurality of audio sections by the optimized thresholds and to decide partial video information to be extracted on the basis of the classified audio sections concerned, and a generation process is to digest information on the basis of the decided partial video information.

In general, a feature of the audio information added to the video information depends upon a genre of a TV or other program.

For example, a news program has a silent part between news pieces. In other words, in the news program, the silent part indicates a part where a scene is changed over or a part where contents are switched and a part that follows the silent part shows the beginning of the next contents, especially, often shows an outline of the contents concerned, which indicates a feature part of the video information.

In addition, in video information having cheer sounds in background noise forming the audio information added to the video information concerned such as a sport-watching program, the cheer sounds in the audio information will be extremely high in sound level in the exciting part of the contents and therefore the sound level of the cheer sounds indicates a feature part of the video information. Further, a sport program has no or very little silent part while always having cheer sounds in background noise, and therefore there is a need for setting a higher value to a threshold of an audio section indicating an exciting part of the contents than that to other video information.

In this manner, sound characteristics of the audio information added to the video information concerned depend upon a type of the video information.

Accordingly, in the present invention, thresholds in classifying a plurality of audio sections used as reference to the decision of the partial video information can be optimized on the basis of the identification information in the video information, thereby enabling an accurate extraction of the partial video information to be extracted even for a different type of video information so as to obtain digest information based on the contents of the video information.

Further, the partial video information to be extracted can be extracted accurately only by optimizing the thresholds, thereby enabling an easy decision of the partial video information without a need for changing a processing operation of the partial video information for each type of video information.

In one aspect of the present invention, the decision process is to decide the partial video information to be extracted on the basis of at least the time-base position of at least any one of the plural types of classified audio sections.

According to this aspect, preferably the decision process is to decide the partial video information to be extracted on the basis of at least the time-base position of at least any one of the plural types of audio sections classified in the video information.

In general, since the audio information added to the video information shows feature parts such as exciting parts of a program, scene change parts, and parts where contents are switched, it plays an important role in summarizing the video information in shorter time.

For example, a part that follows a silent part in the video information to which the audio information is added shows the beginning of the next contents, especially, often shows an outline of the contents concerned, and therefore the end position on the time axis of the silent part is an important part in grasping the contents of the video information. In addition, a noise part containing loud voices in the video information also becomes a feature part, and therefore the start position of the noise part becomes an important part in grasping the contents of the video information.

Accordingly, in the present invention, it is possible to decide partial video information to be extracted on the basis of at least the time-base position of at least any one of the plural types of audio sections classified in the video information, thereby enabling an accurate extraction of the exciting part of the video information and the content change part as partial video information and obtaining digest information based on the contents of the video information.

In another aspect of the present invention, if the obtained identification information shows an identification of video information having silent parts, the decision process is to obtain the silent sections at least partially having the silent parts when the audio information is classified into the plurality of audio sections and to decide the partial video information at least on the basis of the silent section concerned, and the optimization process is to optimize the thresholds used for obtaining the silent sections.

According to this aspect, preferably, if the obtained identification information shows an identification of video information having silent parts, the optimization process is to optimize the thresholds used for obtaining silent sections and the decision process is to obtain the silent sections from the audio information on the basis of the optimized thresholds and to decide the partial video information to be extracted.

The sound characteristics in the video information depend upon a type of the video information concerned. Additionally, in the video information having silent parts, it is important to detect the silent parts accurately when extracting the feature part.

Therefore, in the present invention, if the identification information of the video information shows an identification of video information having silent parts such as a news program, silent sections having silent parts can be obtained accurately by using appropriate thresholds for the video information, thereby enabling a user to obtain digest information based on the contents of the video information.

In further aspect of the present invention, if the obtained identification information shows an identification of video information having cheer sounds in background noise forming the audio information, the decision process is to obtain the cheer sound sections having the cheer sounds when the audio information is classified into the plurality of audio sections and to decide the partial video information at least on the basis of the cheer sound section concerned, and the optimization process is to optimize the thresholds used for obtaining the cheer sound sections.

According to this aspect, preferably, if the obtained identification information shows an identification of video information having cheer sounds in background noise forming the audio information, the optimization process is to optimize the thresholds used for obtaining cheer sound sections and the decision process is to obtain the silent sections from the audio information on the basis of the optimized thresholds and to decide the partial video information to be extracted.

The sound characteristics in the video information depend upon a type of the video information concerned. Additionally, in the video information having cheer sounds in background noise forming the audio information added to the video information concerned, it is important to detect the cheer sound sections accurately when extracting the feature part.

Therefore, in the present invention, if the identification information of the video information shows an identification of video information having cheer sounds in background noise such as a sport-watching program, cheer sound sections can be detected accurately by using optimized thresholds for the video information, thereby enabling a user to obtain digest information based on the contents of the video information.

The above object of the present invention can be achieved by a video information summarizing method of the present invention for extracting one or more pieces of partial video information as some parts of video information from content information made of audio information and the video information and for generating digest information having a shorter time length of the video information on the basis of the partial video information extracted and importance. The method is provided with: an obtaining process for obtaining identification information for identifying a type of the content information; a decision process for classifying the content information into a plurality of content sections on the basis of thresholds in the content information and for deciding the partial video information to be extracted; an optimization process for optimizing the importance set to each of the partial video information on the basis of the obtained identification information; a setting process for setting the optimized importance to each of the partial video information; and a generation process for extracting the decided partial video information from the video information on the basis of the importance to generate the digest information.

According to the present invention, an obtaining process is to obtain identification information for identifying a type of content information, a decision process is to classify the content information into a plurality of content sections on the basis of thresholds and to decide partial video information to be extracted, an optimization process is to optimize the importance set to each partial video information on the basis of the obtained identification information, a setting process is to set the optimized importance to the partial video information, and a generation process is to generate digest information on the basis of the decided partial video information and importance.

In general, a feature of the video information added to the content information depends upon a genre of a TV or other program.

For example, a news program has a scene change part between news pieces. In other words, in the news program, the scene change part indicates a part where a scene is changed over or a part where contents are switched and a part that follows the scene change part shows the beginning of the next contents, especially, often shows an outline of the contents concerned, which indicates a feature part of the content information. Therefore, this part is very important in comparison with sections other than the scene change sections.

In addition, in video information added to the content information concerned such as a sport-watching program, an exciting part of the contents often causes frequent scene changes and therefore intervals of the scene changes indicate feature parts of the content information.

In this manner, characteristics of the video information contained in the content information concerned depend upon a type of the content information.

Accordingly, in the present invention, the importance in generating the digest information on the basis of the partial video information can be optimized on the basis of the identification information in the content information, thereby enabling an accurate extraction of the partial video information to be extracted even for a different type of content information so as to obtain digest information based on the contents of the content information.

The above object of the present invention can be achieved by a video information summarizing method of the present invention for extracting one or more pieces of partial video information as some parts of video information from the video information to which audio information is added on the basis of the audio information and for generating digest information having a shorter time length of the video information on the basis of the partial video information extracted. The method is provide with: an obtaining process for obtaining identification information for identifying a type of the video information; a decision process for classifying the video information into a plurality of audio sections on the basis of thresholds in the audio information and for deciding the partial video information to be extracted on the basis of the classified sections; an optimization process for optimizing the importance set to each of the partial video information on the basis of the obtained identification information; a setting process for setting the optimized importance to each of the partial video information; and a generation process for extracting the decided partial video information from the video information on the basis of the importance to generate the digest information.

According to the present invention, an obtaining process is to obtain identification information for identifying a type of video information, a decision process is to classify the video information into a plurality of audio sections on the basis of thresholds and to decide partial video information to be extracted, an optimization process is to optimize the importance set to each partial video information on the basis of the obtained identification information, a setting process is to set the optimized importance to the partial video information, and a generation process is to generate digest information on the basis of the decided partial video information and importance.

In general, a feature of the audio information added to the video information depends upon a genre of a TV or other program.

For example, a news program has a silent part between news pieces. In other words, in the news program, the silent part indicates a part where a scene is changed over or a part where contents are switched and a part that follows the silent part shows the beginning of the next contents, especially, often shows an outline of the contents concerned, which indicates a feature part of the video information. Therefore, this part is very important in comparison with other audio sections such as noise sections.

In addition, in video information having cheer sounds in background noise forming the audio information added to the video information concerned such as a sport-watching program, the cheer sounds in the audio information will be extremely high in sound level in exciting parts of the contents, by which the sound level of the cheer sounds indicates a feature part of the video information. Further, a sport program has no or very little silent part while always having cheer sounds in background noise, and therefore there is a need for setting a higher value to a threshold of an audio section indicating an exciting part of the contents than that to other video information and a need for changing settings of the importance in summary reproduction according to a section used as reference when the summary is reproduced by extracting the exciting contents accurately.

In this manner, sound characteristics of the audio information added to the video information concerned depend upon a type of the video information.

Accordingly, in the present invention, the importance in generating the digest information based on the partial video information can be optimized on the basis of the identification information in the video information, thereby enabling an accurate extraction of the partial video information to be extracted even for a different type of video information so as to obtain digest information based on the contents of the video information.

In one aspect of the present invention, if the decision process is to decide the partial video information to be extracted on the basis of the different thresholds, the optimization process is to optimize the importance for each of the different thresholds on the basis of the obtained identification information; and the setting process is to set the optimized importance to the partial video information.

In the configuration, preferably, if the decision process is to decide the partial video information to be extracted on the basis of the different thresholds, the setting process is to set the importance optimized on the basis of the identification information obtained for each of the different thresholds to each partial video information decided.

Sound characteristics added to the video information depend upon a type of the video information and the importance of the audio section varies according to video information for which summary reproduction is conducted. Especially, in video information having silent sections such as a news program, more importance is given to the silent sections than that to sections having higher sound levels. Additionally, in video information having cheer sounds in background noise forming the audio information added to the video information concerned such as a sport-watching program, more importance is given to sections having higher sound levels than that to silent sections. If partial video information is decided based on a plurality of sound levels, the importance in summary reproduction varies according to different sound levels.

Accordingly, in the present invention, the importance in generating the digest information based on the partial video information can be optimized on the basis of the identification information in the video information and the importance optimized for each of the different audio sections can be set to each partial video information, thereby enabling an accurate extraction of the partial video information to be extracted even for a different type of video information so as to obtain digest information based on the contents of the video information.

In another aspect of the present invention, if the obtained identification information shows an identification of video information having silent parts, the decision process is to obtain silent sections at least partially having silent parts when the audio information is classified into the plurality of audio sections and to decide the partial video information on the basis of the silent section concerned, and the optimization process is to optimize the importance set to the partial video information decided based on the silent sections.

According to this aspect, preferably, if the obtained identification information shows an identification of video information having silent parts, the decision process is to obtain silent sections at least partially having silent parts from the classified audio sections and to decide partial video information on the basis of the silent sections concerned and the optimization process is to optimize the importance set to the partial video information decided based on the silent sections.

Sound characteristics in the video information depend upon a type of the video information concerned and it is important to reproduce the silent parts accurately in summary reproduction in the video information having silent parts.

Accordingly, in the present invention, if the identification information of the video information shows an identification of video information having silent parts such as a news program, it is possible to optimize the importance of partial video information decided based on sections having silent parts, thereby enabling an accurate extraction of the partial video information to be extracted so as to obtain digest information based on the contents of the video information.

In further aspect of the present invention, if the obtained identification information shows an identification of video information having cheer sounds in background noise forming the audio information, the decision process is to obtain cheer sound sections having cheer sounds when the audio information is classified into the plurality of the audio sections and to decide the partial video information on the basis of the cheer sound section concerned, and the optimization process is to optimize the importance set to the partial video information decided based on the cheer sound sections.

According to this aspect, preferably, if the obtained identification information shows an identification of video information having cheer sounds in background noise forming the audio information, the decision process is to obtain cheer sound sections having cheer sounds when the audio information is classified into the plurality of the audio sections and to decide the partial video information on the basis of the cheer sound section concerned and the optimization process is to optimize the importance set to the partial video information decided based on the cheer sound section.

Sound characteristics in the video information depend upon a type of the video information concerned and it is important to reproduce the sections having loud cheer sounds accurately in summary reproduction in the video information having cheer sounds in background noise forming the audio information.

Accordingly, in the present invention, if the identification information of the video information shows an identification of video information having cheer sounds in background noise forming the audio information, it is possible to optimize the importance of partial video information decided based on sections having cheer sounds, thereby enabling an accurate extraction of the partial video information to be extracted so as to obtain digest information based on the contents of the video information.

DETAILED DESCRIPTION OF THE PREFERRED EMBODIMENTS (I) Embodiment

The preferred embodiment of the present invention will now be described hereinafter with reference to the accompanying drawings.

The embodiment is carried out by applying the present invention to a summary reproducing apparatus for summarizing and reproducing audio/video information such as a television broadcasting program provided over a communications line or airwaves.

Figure 1:
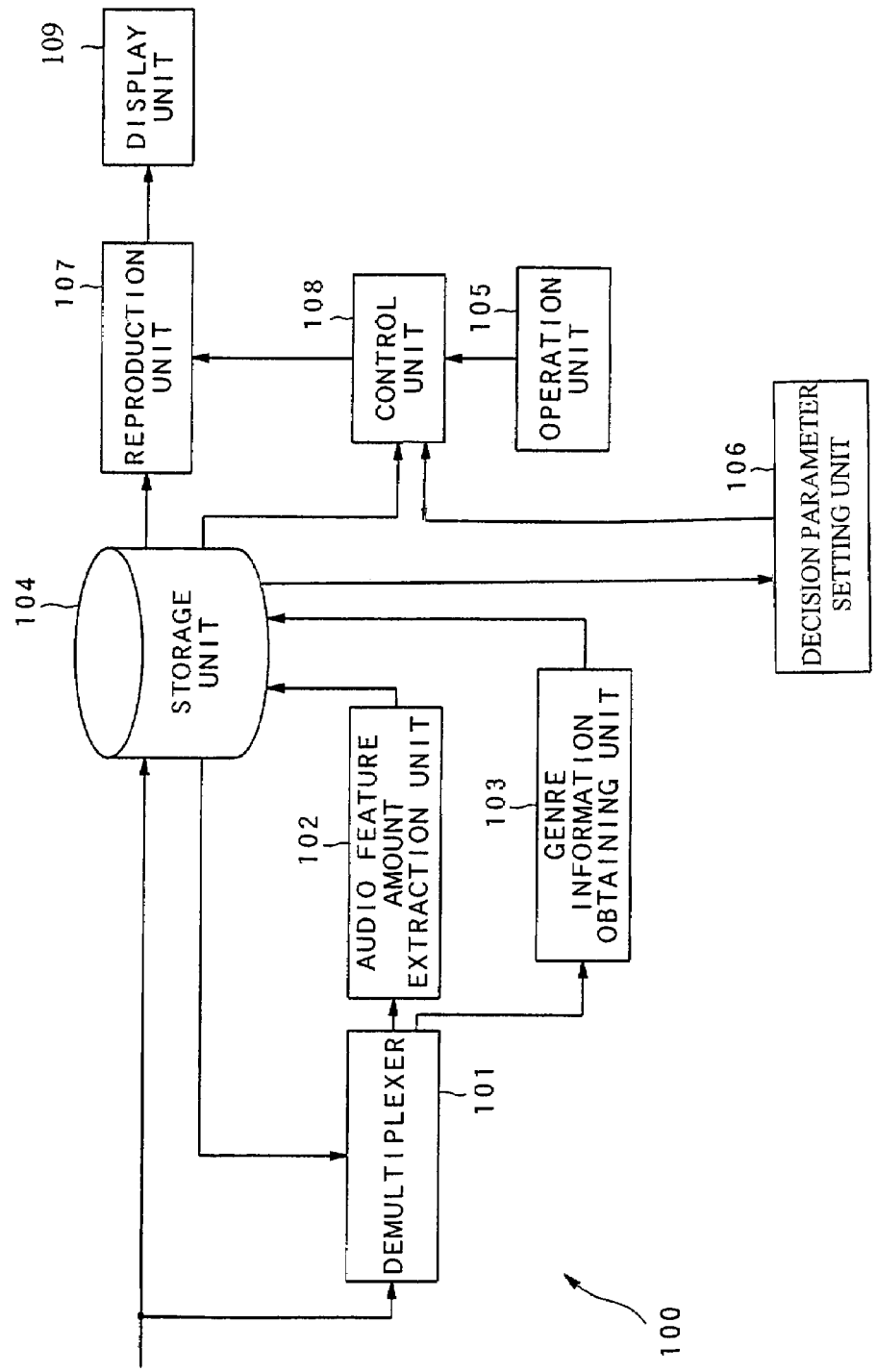
FIG. 1 is a block diagram showing the structure of a summary reproducing apparatus according to the present invention.

Referring first to FIG. 1, the general structure and operation of the summary reproducing apparatus according to the embodiment will be described.

FIG. 1 is a block diagram showing the structure of the summary reproducing apparatus according to the embodiment.

A summary reproducing apparatus 100 of the embodiment shown in FIG. 1 takes in digital audio/video information transmitted from a communications line or received at a receive unit, not shown. Then the summary reproducing apparatus 100 obtains classification information (hereinafter, referred to as genre information) of the audio/video information concerned from the inputted digital audio/video information.

Further, the summary reproducing apparatus 100 extracts a feature amount of audio/video information (hereinafter, referred to as an audio feature amount) inputted on the basis of a plurality of preset thresholds (hereinafter, simply referred to as parameters) and sets a threshold used as reference (hereinafter, referred to as a decision parameter) on the basis of the genre information obtained from the inputted audio/video information. Then the summary reproducing apparatus 100 selects the audio feature amount extracted by the parameter suitable for the set decision parameter concerned and decides (hereinafter, referred to as a decision process of digest segments) partial video information (hereinafter, referred to as digest segments) to be extracted in summary reproduction on the bases of the selected audio feature amount.

As just described, the summary reproducing apparatus 100 decides digest segments to be extracted and extracts the digest segments from the audio/video information on the basis of the decided digest segments for summary reproduction.

The process to decide digest segments to be extracted is carried out as follows: Potential digest segments (hereinafter, referred to as digest segment candidates) are listed, first, and then digest segments to be extracted are narrowed down from the listed digest segment candidates to decide the digest segments.

Further, assuming that in the embodiment video information and audio information added thereto are multiplexed into the digital audio/video information to be inputted, the embodiment will be described in detail below.

As shown in FIG. 1, the summary reproducing apparatus 100 of the embodiment is provided with: a demultiplexer 101 for demultiplexing information having the audio information and the genre information (hereinafter, referred to as additional information) from the obtained digital audio/video information; an audio feature amount extraction unit 102 for decoding the demultiplexed audio information to obtain an audio feature amount on the basis of the preset parameter; a genre information obtaining unit 103 for obtaining the genre information from the additional information; a storage unit 104 for storing audio/video information and the audio feature amount and the genre information obtained in the audio/video information; an operation unit 105 for use in operating each unit and entering the length of time in which the audio/video information is summarized; a decision parameter setting unit 106 for setting an optimum decision parameter in extracting the audio feature amount on the basis of the genre information; a reproduction unit 107 for performing summary reproduction of the stored audio/video information; a control unit 108 for deciding digest segments in the audio/video information stored on the basis of the audio feature amount extracted by the parameter suitable for the decision parameter and for controlling the reproduction unit 107; and a display unit 109 for displaying the summarized and reproduced video signals while outputting associated audio signals.

The genre information obtaining unit 103 and the decision parameter setting unit 106 constitute an obtaining device and an optimization device according to the present invention, respectively. The control unit 108 and the reproduction unit 107 constitute a generation device according to the present invention. Furthermore, the control unit 108 constitutes a decision device and a setting device according to the present invention.

The digital audio/video information sent from the communications line or received at the receive unit, not shown, or the digital audio/video information that has already been stored in the storage unit 104 are inputted into the demultiplexer 101. The demultiplexer 101 demultiplexes the audio information and the additional information from the inputted digital audio/video information, and outputs the demultiplexed information to the audio feature amount extraction unit 102 and the genre information obtaining unit 103.

This additional information partially has genre information such as, for example, a news program, a sport-watching program, a movie, a drama, a popular song program, or a variety program. Program arrangement information (service information) corresponds to the additional information in BS (broadcasting satellite) digital broadcasting. In this case, the demultiplexer 101 outputs the service information to the genre information obtaining unit 103.

The audio information as digital signals outputted from the demultiplexer 101 is inputted into the audio feature amount extraction unit 102. The audio feature amount extraction unit 102 decodes the inputted audio information, obtains an audio feature amount of the audio information such as, for example, a sound level or frequency characteristics on the basis of a plurality of preset parameters, and outputs the obtained audio feature amount to the storage unit 104.

Specifically, the audio feature amount extraction unit 102 calculates an average sound pressure level (power) per unit time on the basis of the inputted audio information or calculates a sound pressure level for each frequency so as to extract a plurality of audio sections on the basis of the plurality of preset parameters.

In this embodiment, a plurality of audio sections are extracted by using a plurality of preset audio levels as parameters, for example, silent sections and audio sections such as a plurality of noise sections having different thresholds (sound levels) are detected. The detecting process of the audio sections will be described later.

The genre information obtaining unit 103 receives an input of the additional information (service information) outputted from the demultiplexer 101. The genre information obtaining unit 103 obtains genre information such as a movie or news in the audio/video information on the basis of the inputted additional information (service information) and outputs the genre information to the storage unit 104.

It should be noted that the genre information can be obtained separately from the inputted digital audio/video information. For example, it is possible to obtain genre information related to the inputted audio/video information stored in an arbitrary place through a communications line such as the Internet.

In addition, instead of obtaining the genre information from the inputted audio/video information, it can also be presumed on the basis of the audio information in the inputted audio/video information.

In this case, the embodiment is provided with a presumption unit for use in presuming a genre from the inputted audio/video information. For example, text information having a feature identifying each genre is prepared in advance. Then, audio is extracted from the inputted audio/video information by using a speech recognition technology, a calculation is made on the coincidence between the speech recognition result treated as text information and the prepared text information, and the genre is presumed on the basis of the calculation result.

The storage unit 104 stores the digital audio/video information inputted, the audio feature amount of the audio information extracted by the audio feature amount extraction unit 102, and the genre information of the audio/video information obtained by the genre information obtaining unit 103. The storage unit 104 also outputs the audio/video information to the reproduction unit 107 and the audio feature amount and the genre information to the decision parameter setting unit 106 and the control unit 108 in accordance with instructions from the control unit 108.

The operation unit 105 allows a user to instruct storage control of the audio/video information, instruct reproduction of the stored audio/video information, and enter a summary reproducing time at the time of summary reproduction. With an input of these instructions to the control unit 108, the control unit 108 controls each unit according to these instructions.

The decision parameter setting unit 106 receives an input of the genre information outputted from the storage unit 104. The decision parameter setting unit 106 sets a decision parameter for use in a decision process of digest segments to be extracted by the control unit 108, specifically, an optimum audio level on the basis of the inputted genre information and outputs a value (audio level) of the set decision parameter to the control unit 108.

The decision parameter setting unit 106 optimizes the importance in deciding the digest segments to be extracted on the basis of the inputted genre information and outputs the optimized value or a parameter for the optimization to the control unit 108. The optimization of the importance will be described later.

The reproduction unit 107 receives an input of the digital audio/video information outputted form the storage unit 104. The reproduction unit 107 demultiplexes and decodes the inputted multiplex audio/video information into the video information and the audio information and then reproduces a summary in accordance with the instructions from the control unit 108. In addition, the reproduction unit 107 outputs the reproduced audio signals and video signals to the display unit 109.

The control unit 108 controls the storage into the storage unit 104 in accordance with instructions inputted from the operation unit 105 and decides digest segments described later on the basis of the audio feature amount and the parameter set by the audio feature amount extraction unit 102 and the decision parameter setting unit 106. Then the control unit 108 performs control of the reproduction operation of the reproduction unit 107 on the basis of the decided digest segments.

The display unit 109 receives an input of the audio signals and the video signals outputted from the reproduction unit 107. The display unit 109 displays the inputted video signals on a monitor screen or the like while amplifying the audio signals by means of a speaker or the like.

Figure 2:
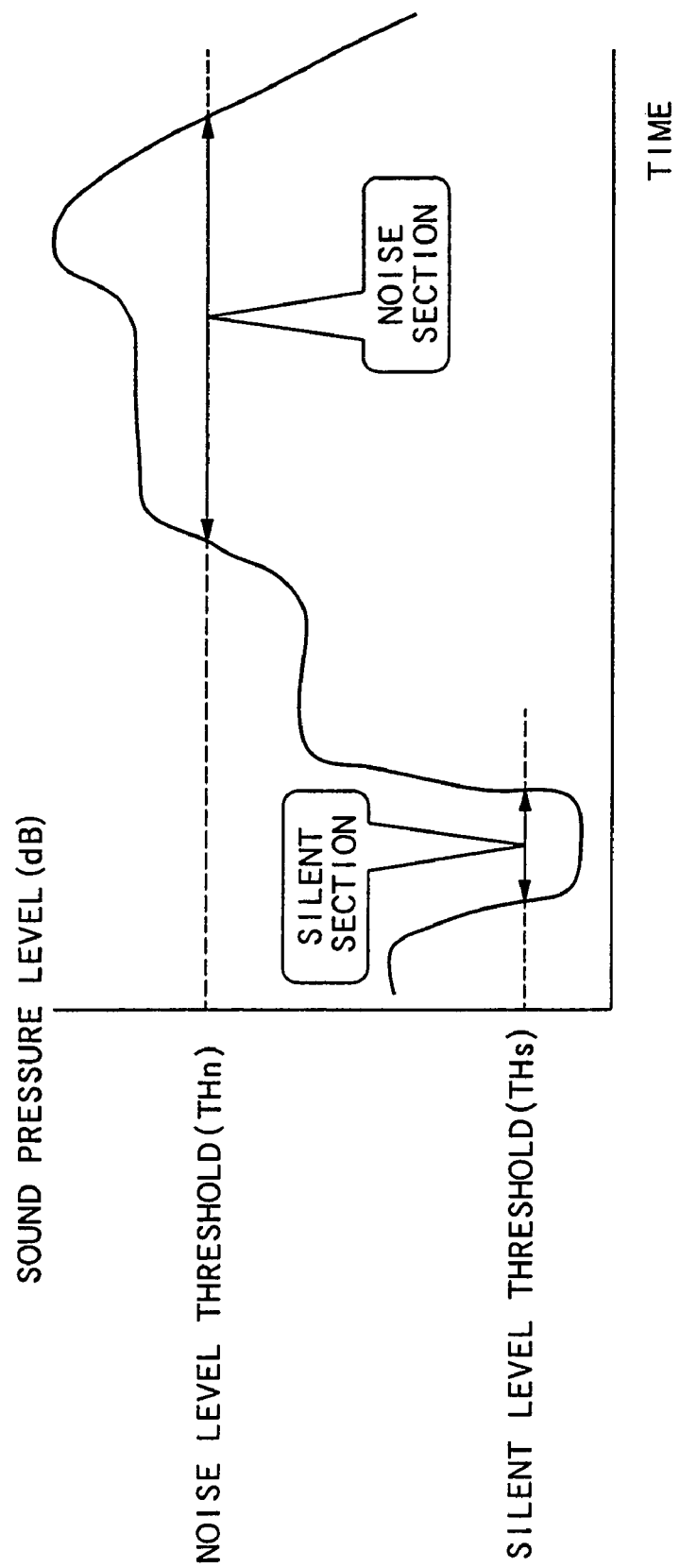
FIG. 2 is a graph of assistance in explaining a principle of detecting a silent section and a noise section in an embodiment.
Figure 3:
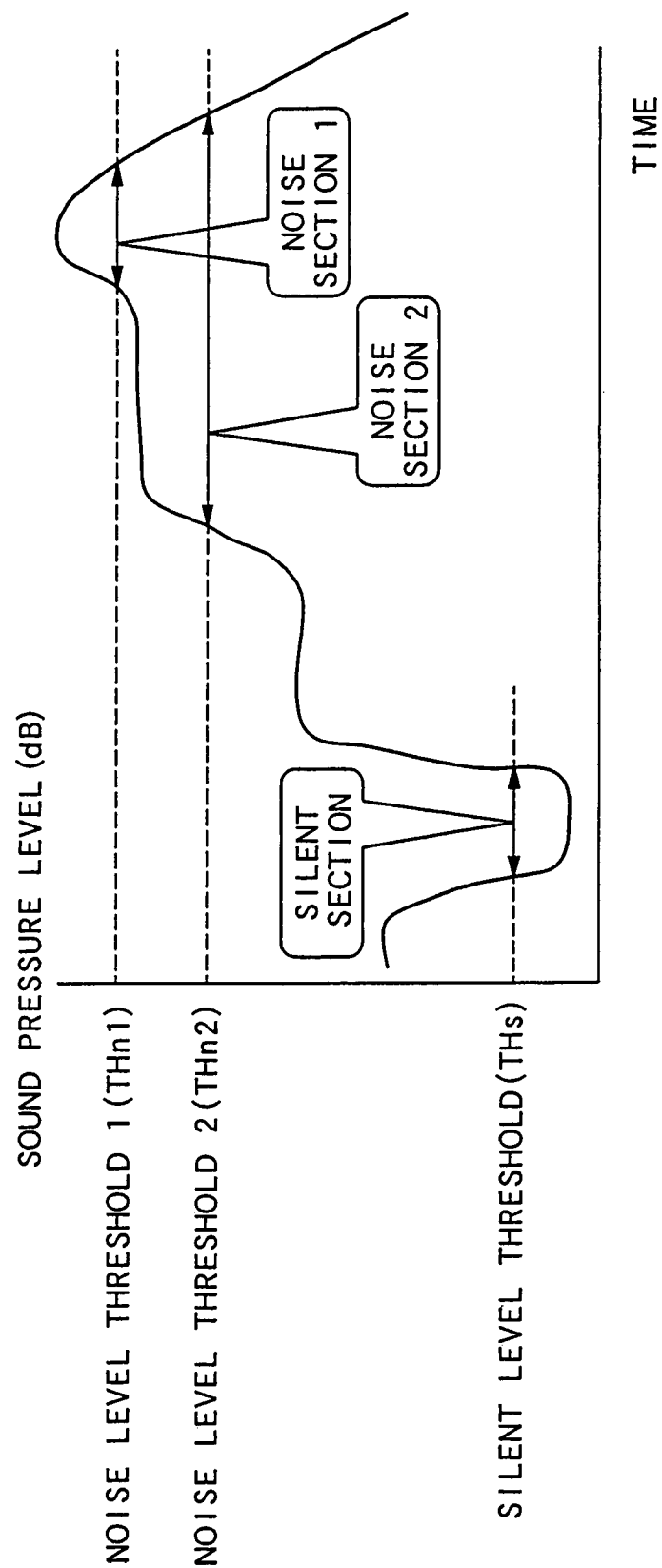
FIG. 3 is a graph of assistance in explaining a principle of detecting a plurality of noise sections in the embodiment.

Referring next to FIGS. 2 and 3, the following describes the audio feature amount extraction process according to this embodiment.

It should be noted that FIGS. 2 and 3 are graphs of assistance in explaining a principle of detecting a silent section and a noise section in the embodiment.

In general, the audio information added to the audio/video information plays an important role in summarizing the audio/video information in shorter time than the time length of the audio/video information recorded or provided over a communications line or the like.

For example, in a television broadcasting program, a noise section indicates an exciting part of the program, while a silent section indicates a part where a scene is changed over or where program contents are switched.

Specifically, if the program is a news program, since a silent section or so-called "interval (pause)" is taken at the time of switching news contents and the part that follows the "pause" shows the next contents, the part will be a feature part of the video information. Especially, the part that follows the silent section shows the beginning of the next contents, and often shows an outline of the contents concerned.

On the other hand, if the program is a sport-watching program, since responses from spectators show in background noise such as shouts and cheers, in an exciting scene (a home run scene in a baseball game or a goal scene in a soccer game) an announcer and spectators voices will be louder naturally, so that the audio level will be much higher than the other scenes. Then, the part including the exciting scene can be regarded as a feature part of the video information.

Therefore, a detection of silent sections becomes important in the audio/video information having silent sections such as a news program. On the other hand, in the audio/video information having cheer sounds in background noise such as a sport-watching program, almost no silent section will be detected and more appropriate summary reproduction is achieved by detecting noise sections having different thresholds.

As mentioned above, an audio section such as a silent section or a noise section to be extracted and an optimum threshold in the audio section are various according to a genre.

As mentioned above, in this embodiment, the audio feature amount extraction unit 102 previously calculates an average sound pressure level (power) per unit time in the extracted audio information, and extracts a plurality of audio sections such as silent sections or noise sections according to a plurality of thresholds, for example, audio levels. Then, the decision parameter setting unit 106 sets a decision parameter for the extraction on the basis of the inputted genre information, and the control unit 108 selects an optimum audio section for use in deciding digest segments from the extracted audio sections according to the parameter suitable for the set decision parameter.

Specifically, if the audio/video information is a sport-watching program, the decision parameter setting unit 106 selects noise sections having higher thresholds (audio levels) than those in a news program, while making settings for inhibiting a process for silent sections in a sport-watching program since it has always cheer sounds in all scenes and almost no silent section is detected in contrast. If it is a news program, the decision parameter setting unit 106 adopts sections having low sound levels for detecting silent sections and standard noise sections.

In this embodiment, if silent sections and noise sections are detected, the audio feature amount extraction unit 102, as shown in FIG. 2, detects a time-base start position (hereinafter, simply referred to as a start position) and a time-base end position (hereinafter, simply referred to as an end position) in the audio/video information of each of the silent and noise sections in the audio/video information on the basis of a preset threshold of a silent level (hereinafter, referred to as a silent level threshold ($TH_s$)) and a threshold of a noise level (hereinafter, referred to as a noise level threshold ($TH_n$)). In this embodiment, time information on the start and end positions detected for each of the silent and noise sections is outputted to the storage unit 104. Hereinafter, the length of time for each of the silent and noise sections is referred to as a section length.

Specifically, as mentioned above, the audio feature amount extraction unit 102 calculates an average sound pressure level (power) per unit time on the basis of the inputted audio information. If the audio information obtained from the calculated value is equal to or less than the silent level threshold ($TH_s$) or equal to or more than the noise level threshold ($TH_n$) and further a section equal to or more than a preset length of time (hereinafter, referred to as a minimum silent-section length ($DRS_{Min}$) or the minimum noise section length ($DRN_{Min}$)) is detected, the section is detected as a silent section or a noise section.

As for the standard values of the audio levels, since a normal voice of an announcer in a news program is equal to −50 dB or more as a standard value of the audio level, the silent level threshold ($TH_s$) is set to −50 dB, and since the audio level of background noise in a sport program when spectators have gotten into full swing becomes about −35 dB, the noise level threshold ($TH_n$) is set to −35 dB. For detecting a plurality of silent sections and noise sections, a plurality of vales are set with reference to these audio levels.

Further, considering the audio levels in the news program and the sport-watching program, the minimum silent section length ($DRS_{Min}$) and the minimum noise section length ($DRN_{Min}$) are set to 0.2 sec. and 1.0 sec., respectively, in the embodiment.

Referring further to FIG. 3, there is shown a diagram of detecting a plurality of noise sections according to a plurality of noise level thresholds ($TH_n$). If a plurality of noise sections are detected, as shown in FIG. 3, different audio levels, in other words, noise level thresholds ($TH_{n1}$) and ($TH_{n2}$) are used to detect noise sections 1 and 2, respectively.

The following describes the optimization of the importance in the embodiment.

As mentioned above, in the television broadcasting program, a noise section indicates an exciting part of the program, while a silent section indicates a part where a scene is changed over or where program contents are switched. If the program is a sport-watching program, since responses from spectators show in background noise such as shouts and cheers, an exciting scene will be much higher in audio level than the other scenes, and the part including the exciting scene can be regarded as a feature part of the video information.

On the other hand, if the program is a news program, since a silent section or so-called "interval (pause)" is taken at the time of switching news contents and the part that follows the "pause" shows the next contents, the part will be a feature part of the video information. Especially, the part that follows the silent section shows the beginning of the next contents, and often shows an outline of the contents.

In other words, the silent section becomes more important than the noise section in the audio/video information having silent sections such as a news program. On the other hand, the noise section is more important than the silent section in the audio/video information having background noise of shouts and cheers such as a sport-watching program.

In this manner, since the importance of the digest segments set according to audio sections depends upon a genre, the importance is optimized for each genre on the basis of the genre information obtained by the decision parameter setting unit 106 in this embodiment.

Specifically, if the genre information obtaining unit 103 obtains genre information of the audio/video information having silent sections such as a news program, the importance of the digest segments decided according to the silent section is set by using weighing functions described below. In the embodiment, this parameter is outputted to the control unit 108.

Importance $f(x)=ax+b$ (Eq. 1)

Importance $f(x)=x+100$ (Eq. 2)

where x is a value of the importance which is normally set and a section length of each audio section is used for it in the embodiment and where a and b are constants.

On the other hand, if the information is the audio/video information having cheer sounds in background noise such as a sport-watching program, a plurality of noise sections such as, for example, the noise sections 1 and 2 shown in FIG. 3 are selected and the importance of the digest segments set according to the noise section 1 having a high threshold is set higher than the importance of the digest segment decided according to the noise section 2 by using a weighing function used for setting the importance of the digest segment decided on the basis of the silent section.

Figure 4:
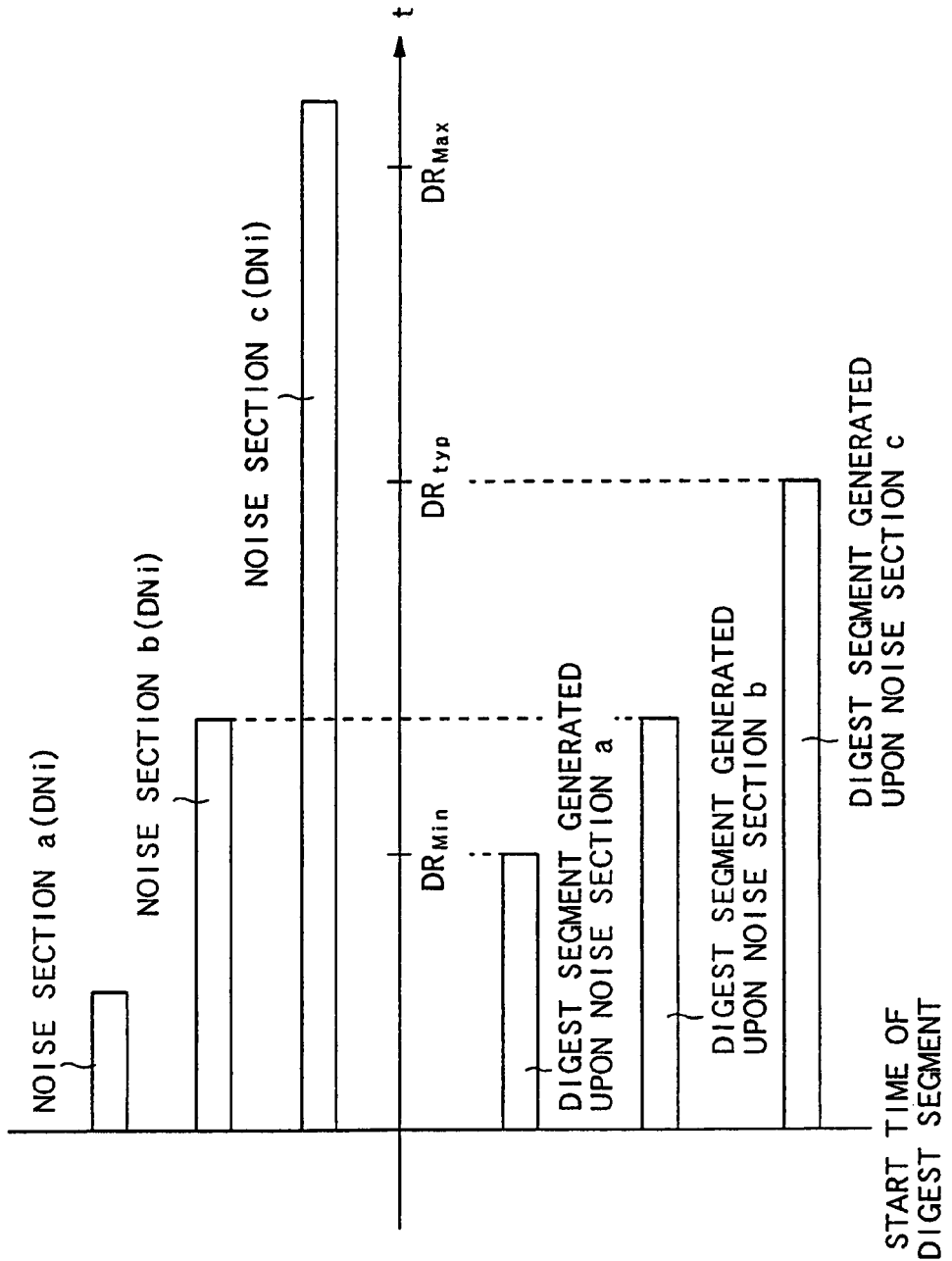
FIG. 4 is a graph of assistance in explaining a principle of deciding the start and stop time of a segment based on a noise section.
Figure 5:
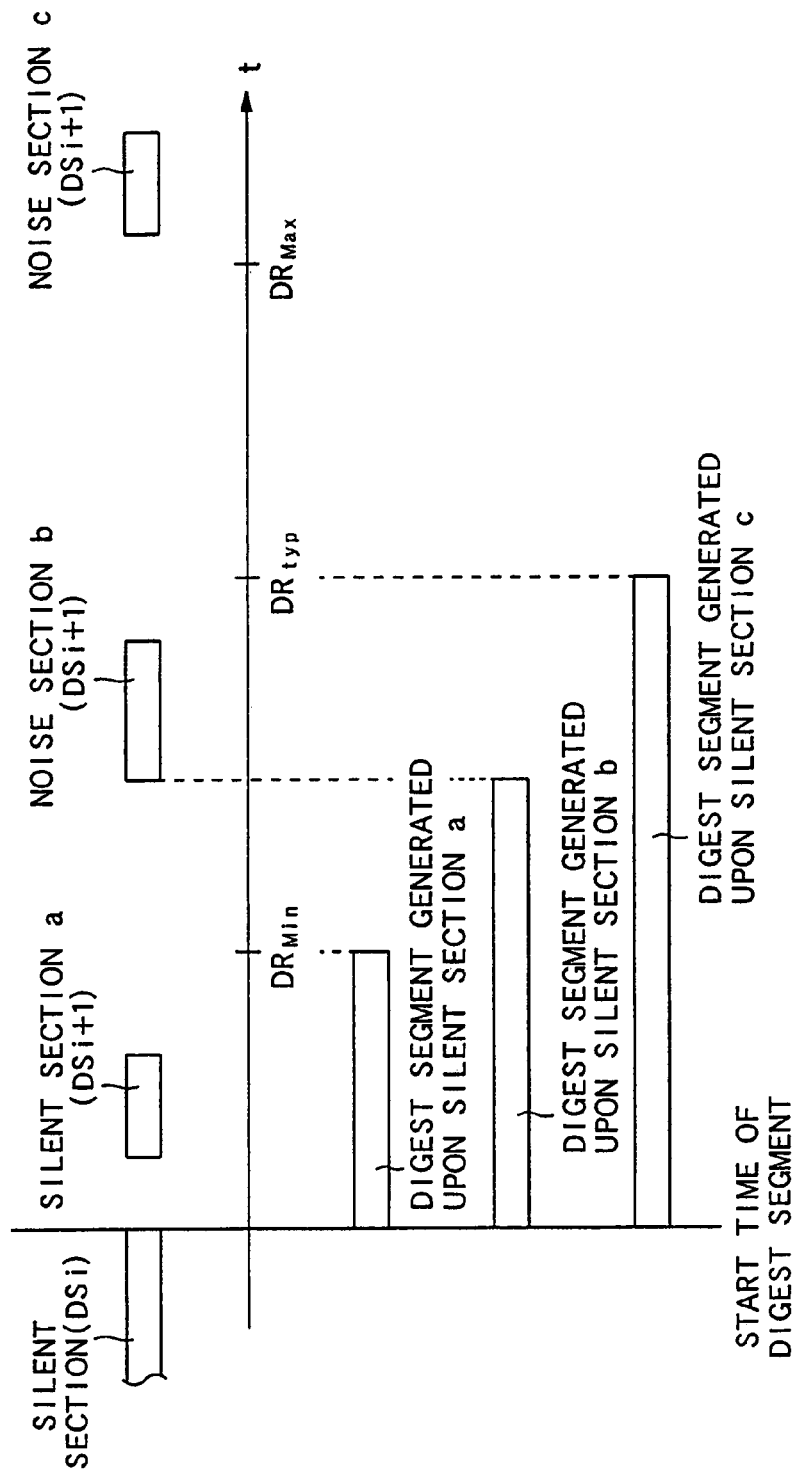
FIG. 5 is a graph of assistance in explaining a principle of deciding the start and stop time of a segment based on a silent section.

The following describes the decision process of the digest segments to be extracted in this embodiment by using FIGS. 4 and 5.

Referring to FIG. 4, there is shown a graph of assistance in explaining a principle of deciding the start and stop time of a segment based on the noise section. Referring to FIG. 5, there is shown a graph of assistance in explaining a principle of deciding the start and stop time of a segment based on the silent section.

As mentioned above, in a news program, since a silent section or so-called "interval (pause)" is taken at the time of switching news contents and the part that follows the "pause" shows the next contents and the part is to be a feature part of the video information, the part that follows the silent section becomes important.

If the program is a sport-watching program, since responses from spectators show in background noise such as shouts and cheers, an exciting scene will be much higher in audio level than the other scenes, and the part including the exciting scene can be regarded as a feature part of the video information.

In this manner, since a relative position on the time axis between a silent or noise section and a feature part of the audio/video information and their importance are various, a process to decide the digest segments to be extracted based on the silent and noise sections are to be performed in another process. The following describes the digest segment decision process according to the embodiment.

In the digest segment decision process of the embodiment, the start time ($STSS_i$), stop time ($SESS_1$), and importance ($IPSS_i$) of each digest segment are decided on the basis of a silent section and noise section. It should be noted that, however, "i" indicates that the section is the i-th silent or noise section, and "j" indicates the j-th digest segment.

In the digest segment decision process of the embodiment, the start time and importance of each digest segment are decided on the basis of a silent or noise section to list digest segment candidates. The digest segment candidates are then narrowed down to decide the minimum digest-segment time length, the typical digest-segment time length, and the maximum digest-segment time length so as to decide the stop time of each of the narrowed-down digest segments.

Further, in the digest segment decision process of the embodiment, the section length information ($DRSS_j$) of the silent section and the noise section, which has been used as a base for deciding a digest segment, is held. In the embodiment, after the digest segments are decided once and narrowed down, to decide the stop time, it is necessary to determine whether the section length information ($DRSS_j$) indicates the digest segment decided on the basis of the silent section or the noise section in deciding the stop time described later, and then the section length information ($DRSS_j$) is used for the determination.

Specifically, in the embodiment, the section length of the noise section used as reference is set for the digest segment set based on the noise section ($DRDN_i=DRSS_j$). On the other hand, $DRSS_j=0$ is set for the digest segment based on the silent section.

Therefore, in the digest segment decision process, when the stop time is decided in a manner described later, it can be determined that the digest segment is set based on the silent section if $DRSS_j=0$, or the noise section if $DRSS_j \neq 0$.

Setting of Digest Segment in Noise Section

As mentioned above, since the noise section shows an exciting part of the program, the noise section itself becomes important. In the embodiment, as shown in FIG. 4, the start position of the noise section detected by the detection unit 103 is set as the start position of the digest segment.

In a sport-watching program, if shouts and cheers from spectators are collected and the collected sound is contained as background noise in the audio information added to the audio/video information, it will be more effective in summary reproduction that the reproduction starts from a part a bit previous to the exciting scene. In general, an exciting part such as a good play and a goal or scoring scene in a sport game has some time delay until the spectators cheer over the exciting scene, that is, until the noise section appears. For this reason, the start time of the digest segment based on the noise section in the audio/video information such as on the sport-watching program may be moved forward $\Delta t$ from the actual start time of the noise section.

On the other hand, the stop time of the digest segment in the noise section is decided on the basis of the end position of the noise section.

In view of the contents of the digest segment to be extracted, the end position of the noise section basically needs to be set at the stop time of the digest segment. However, if the time length of the digest segment to be extracted is too short, the scene concerned may be made difficult to understand. On the other hand, unnecessarily long time length could contain a lot of needless information, and an increase in information amount makes it impossible to summarize the video information unerringly.

To avoid the above-mentioned problems, the minimum digest-segment time length ($DR_{Min}$), the typical digest-segment time length ($DR_{Typ}$), and the maximum digest-segment time length ($DR_{Max}$) are set in a manner described later for use in setting the stop time of the digest segment.

For example, as shown in FIG. 4, when the noise section ($DN_i$ (e.g., the noise section a in FIG. 4)) does not reach the minimum digest-segment time length ($DR_{Min}$), the time length of the digest segment is the minimum digest-segment time length ($DR_{Min}$). The minimum digest-segment time length ($DR_{Min}$) is added to the start time of the digest segment, and the resultant time is set for the stop time of the digest segment.

When the noise section ($DN_i$ (e.g., the noise section b in FIG. 4)) is equal to or more than the minimum digest-segment time length ($DR_{Min}$), and equal to or less than the maximum digest-segment time length ($DR_{Max}$), the noise section length is the time length of the digest segment, and the stop time of the digest segment is set at the end position of the noise section.

Further, when the noise section ($DN_i$ (e.g., the noise section c in FIG. 4)) exceeds the maximum digest-segment time length ($DR_{Max}$), the typical digest-segment time length ($DR_{Typ}$) is added to the start time of the digest segment, and the resultant time is set for the stop time of the digest segment.

In other words, the stop time of the j-th digest segment in the i-th noise section is determined from the segment time length ($DRDN_i = DRSS_j$) as follows:

If $0 < DRSS_i < DR_{Min}$, $SESS_j = STSS + DR_{Min}$. (Eq. 3)

If $DR_{Min} \leq DRSS_i \leq DR_{Max}$, $SESS_j = STSS + DRSS_i$. (Eq. 4)

If $DR_{Max} \leq DRSS_i$, $SESS_j = STSS + DR_{Typ}$. (Eq. 5)

It should be noted that when the start time of the digest segment was moved forward $\Delta t$ from the start time of the noise section, $\Delta t$ needs to be subtracted from each of the minimum digest-segment time length ($DR_{Min}$), the typical digest-segment time length ($DR_{Typ}$), and the maximum digest-segment time length ($DR_{Max}$) so that the time length of the digest segment will be consistent with those of the other digest segments.

In the embodiment, the stop time of each digest segment is set for the digest segments that were narrowed down from the digest segment candidates in the process to narrow down digest segment candidates to be described later. In other words, the start time of each digest segment is set on the basis of the noise section to list digest segment candidates, then, the process to narrow down the digest segment candidates is performed in a manner described later. After that, the minimum digest-segment time length ($DR_{Min}$), the typical digest-segment time length ($DR_{Typ}$), and the maximum digest-segment time length ($DR_{Max}$) are set to set the stop time of the digest segment.

On the other hand, the importance ($IPSS_j$) of the digest segment in the noise section is set using the section length ($DRDN_i$) of the noise section. The longer the section length of the noise section, the more the importance can be set. However, if the importance set to each digest segment is optimized by the decision parameter setting unit 106, the optimized importance is employed.

Setting of Digest Segment in Silent Section

As mentioned above, since the silent section shows a scene change part or a part that switches contents, the part that follows the end of the silent section becomes important. In the embodiment, as shown in FIG. 5, the end position of a silent section having a section length (hereinafter called the additional minimum silent-section length ($DRSA_{Min}$)) equal or more preset for the silent section detected by the detection unit 103, for instance, 1.0 sec., is set for the start time (STSS) of the digest segment.

Of course, the silent section could be of little or no importance. To detect a part in which there is an obvious "pause" that ensures the occurrence of a change in contents, the additional minimum silent-section length ($DRSA_{Min}$) is laid down in deciding a digest segment so that the end position of a silent section having a section length equal to or more than the additional minimum silent-section length ($DRSA_{Min}$) will be set for the start position of the digest segment.

On the other hand, the stop time of the digest segment in the silent section is decided on the basis of the start position of the silent section that follows the silent section used for setting the start time of the digest segment.

In this case, the section length of the silent section that follows the silent section used for setting the start time of the digest segment does not need to be equal to or more than the additional minimum silent-section length ($DRSA_{Min}$). Therefore, all the silent sections detected by the detection unit 103 are searched.

Like in the noise section, the stop time of the digest segment is set in a manner described later using the minimum digest-segment time length ($DR_{Min}$), the typical digest-segment time length ($DR_{Typ}$), and the maximum digest-segment time length ($DR_{Max}$).

For example, as shown in FIG. 5, when the start position of the silent section ($DS_{i+1}$ (e.g., the silent section a in FIG. 5)), which is detected immediately after the silent section set as the start time of the digest segment, does not reach the minimum digest-segment time length ($DR_{Min}$), the time length of the digest segment is the minimum digest-segment time length ($DR_{Min}$). The minimum digest-segment time length ($DR_{Min}$) is added to the start time of the digest segment, and the resultant time is set for the stop time of the digest segment.

When the start position of the silent section ($DS_{i+1}$ (e.g., the silent section b in FIG. 5)), which is detected immediately after the silent section set as the start time of the digest segment, exceeds the minimum digest-segment time length ($DR_{Min}$) but does not reach the maximum digest-segment time length ($DR_{Max}$), the start position of the detected silent section ($DS_{i+1}$) is set for the stop time of the digest segment.

Further, when the start position of the silent section ($DS_{i+1}$ (e.g., the silent section c in FIG. 5)), which is detected immediately after the silent section set as the start time of the digest segment, exceeds the maximum digest-segment time length ($DR_{Max}$), the time length of the digest segment is the typical digest-segment time length ($DR_{Typ}$). The typical digest-segment time length ($DR_{Typ}$) is added to the start time of the digest segment, and the resultant time is set for the stop time of the digest segment.

In the embodiment, when the stop time of the digest segment is set using the minimum digest-segment time length ($DR_{Min}$), the typical digest-segment time length ($DR_{Typ}$), and the maximum digest-segment time length ($DR_{Max}$), the next silent section is detected in the following sequence.

The silent section ($DS_{i+1}$) that follows the silent section used as reference to the start time of the digest segment is detected in the following sequence of operations. First of all, it is detected whether the start position of the silent section ($DS_{i+1}$) detected immediately after the silent section ($DS_1$) is equal to or more than the minimum digest-segment time length ($DR_{Min}$) and equal to or less than the maximum digest-segment time length ($DR_{Max}$). If the start position does not exist within the range, it is then detected whether the start position of the silent section ($DS_{i+1}$) detected immediately after the silent section ($DS_i$) exists within the minimum digest-segment time length ($DR_{Min}$). If the start position does not exist within the range, the silent section ($DS_{i+1}$) detected immediately after the silent section ($DS_i$) is determined to be in a range of the maximum digest-segment time length ($DR_{Max}$) or more.

In other words, the stop time of the j-th digest segment in the i-th silent section is determined as follows:

If the start position (ST) of the silent section ($DS_{i+1}$) was found in the section [$DR_{Min}$, $DR_{Max}$], $$SESS_j = ST. \quad \text{(Eq. 6)}$$

If the start position (ST) of the silent section ($DS_{i+1}$) was found in the section [0, $DR_{Min}$], rather than the section [$DR_{Min}$, $DR_{Max}$], $$SESS_j = STSS_i + DR_{Min}. \quad \text{(Eq. 7)}$$

If the start position (ST) of the silent section ($DS_{i+1}$) was not found in the section [0, $DR_{Max}$], $$SESS_j = STSS_i + DR_{Typ}. \quad \text{(Eq. 8)}$$

In the sequence of detection of the silent section ($DS_{i+1}$), even when the next silent section ($DS_{i+1}$) exists in the minimum digest-segment time length ($DR_{Min}$), if the start position of another silent section (e.g., $DS_{i+n}$, where n≧2) is equal to or more than the minimum digest-segment time length ($DR_{Min}$), and equal to or less than the maximum digest-segment time length ($DR_{Max}$), the next silent section ($DS_{i+1}$) that exists in the minimum digest-segment time length ($DR_{Min}$) is not handled as the silent section that follows the silent section ($DS_1$) used as reference to the start time of the digest segment, and the silent section ($DS_{i+n}$, where n≧2) is regarded as the next silent section ($DS_{i+1}$). Thus the stop time of the digest segment is decided on the basis of the silent section ($DS_{i+1}$).

Like in the setting of the stop time of the digest segment in the nose section, the stop time of each digest segment in the silent section is set for the digest segments that were narrowed down from the digest segment candidates in the process to narrow down digest segment candidates to be described later.

On the other hand, the importance ($IPSS_j$) of the digest segment in the silent section is basically set in the same manner as in the noise section on the basis of the section length ($DRDN_i$) of the silent section. If the decision parameter setting unit 106 optimizes the importance set to each digest segment, however, the setting is made in accordance with the instruction. For instance, it is calculated by using the following equation 9:

$$IPSS_j = f(DRDS_i) \quad \text{(Eq. 9)}$$

In the equation 9, $f(\bullet)$ is a weighing function, and in the embodiment, (Eq. 1) or (Eq. 2) are used as described above.

Process to Narrow Down Digest Segment Candidates

The summary reproduction process to be described later may be performed on all the digest segments decided as mentioned above on the basis of the silent and noise sections. However, the digest segments to be set are narrowed down for purposes of reduction in amounts to be processed and prevention of reproduction of unnecessary digest segments, that is, prevention of reproduction of inappropriate digest segments, which means that even the digest segment of little importance could be of increasing importance in the merging process to be described later.

In the embodiment, the process to narrow down the digest segments is carried out from the digest segment candidates listed by the following equation 10.

Assuming that the time length of all the digest segments is the minimum limit time ($DR_{LMin}$), the equation 10 is to compare a multiple (e.g., $K_1 = 2$) of the number of digest segments to be narrowed down with the number of digest segment candidates so that the smaller number will be set as the number of digest segments.

For example, if the number of listed digest segment candidates is ($NP_{old}$) and the digest time is S, the number of digest segment candidates ($NP_{new}$) to be newly set is obtained as:

$$NP_{new} = \mathrm{Min}(Int(k_1 \times (S/DR_{LMin})), NP_{old}) \quad \text{(Eq. 10)}$$

In the equation 10, $k_1$ is a constant, Min(a, b) means that smaller one of a and b is selected, and $Int(\bullet)$ means that the fractional portion of the number is dropped. Further, $NP_{new}$ represents the number of digest segment candidates after narrowed down, and the $DR_{LMin}$ represents the minimum limit time.

The minimum limit time ($DR_{LMin}$) is the minimum time necessary for a person to understand the contents of a digest segment. For example, in the embodiment, the minimum limit time ($DR_{LMin}$) is four seconds.

When the number of digest segment candidates thus calculated is larger than the multiple of the number of digest segments to be narrowed down, that is, when $NP_{new} < NP_{old}$, a number of digest segment candidates corresponding to the number $NP_{new}$ are selected in descending order of importance, and the others are deleted from the list of the digest segment candidates.

In the embodiment, the digest segment candidates are thus narrowed down so that the stop time of each digest segment is set for the narrowed-down digest segment candidates according to the above-mentioned setting method.

Setting of Minimum/Typical/Maximum Digest-Segment Time Length

As discussed above, the digest segment to be extracted has a time length as long as possible so that the digest segment will be made understandable. On the other hand, unnecessarily long time length could contain a lot of needless information, and an increase in information amount makes it impossible to summarize the video information unerringly. Therefore, in the embodiment, the minimum digest-segment time length ($DR_{Min}$), the typical digest-segment time length ($DR_{Typ}$), and the maximum digest-segment time length ($DR_{Max}$) are set in a manner described below.

For example, in the embodiment, the minimum digest-segment time length ($DR_{Min}$), the typical digest-segment time length ($DR_{Typ}$), and the maximum digest-segment time length ($DR_{Max}$) are determined by the following equations so that the contents of each digest segment to be extracted will be grasped unerringly.

Considering that the digest segment is made easily visible to the user, the minimum digest-segment time length ($DR_{Min}$) is set as shown in equation 11 so that the digest segment will have a relatively long time length. The typical digest-segment time length ($DR_{Typ}$) and the maximum digest-segment time length ($DR_{Max}$) are calculated by multiplying the minimum digest-segment time length ($DR_{Min}$) calculated from the equation 11 by a constant as shown in equations 12 and 13.

$$DR_{Min}=\text{Max}(DR_{LMin},(K_2 \times (S/NP_{new}))) \quad \text{(Eq. 11)}$$

$$DR_{Typ}=DR_{Min} \times K_{T1} \quad \text{(Eq. 12)}$$

$$DR_{Max}=DR_{Min} \times K_{T2} \quad \text{(Eq. 13)}$$

Here, $K_{T1}$ and $K_{T2}$ are proportional constants, and Max(a, b) means that the larger value out of a and b is selected. Further, $K_2$ ($\geq 1$) is a coefficient for use in deciding the minimum time of each digest segment. The larger the value of $K_2$, the longer the minimum time and the smaller the number of digest segments. For example, $K_2=1$, $K_{T1}=2$, and $K_{T2}=3$ in the embodiment.

Merging of Digest Segments

In the embodiment, when two or more digest segments coincide with each other, the digest segments are merged into a digest segment. In this case, the importance of the digest segment generated by merging two or more digest segments takes the highest value of importance ($IPSS_j$) from among values for all the digest segments (see the following equation 14).

$$IPSS_j=\text{Max}(IPSS_j, IPSS_{j \pm 1}) \quad \text{(Eq. 14)}$$

Further, if $STSS_{j<STSSj+n}$ and $SESS_j \geq SESS_{j+n}$ for two digest segments $SS_j$ and $SS_{j+n}$, the following equation is obtained:

$$SESS^j=SESS_{j+n} \quad \text{(Eq. 15)}$$

Thus, even when a digest segment is of little importance, if the digest segment coincides with another digest segment of much importance, the digest segment of little importance can be complemented by that of much importance.

Decision of Digest Segment

In the embodiment, the digest segment candidates are selected in descending order of importance to achieve the specified digest time in the final process.

The selection of digest segment candidates is continued until the total time of the selected digest segment candidates exceeds the specified digest time.

When the digest segments are decided in descending order of importance, since the time length varies from segment to segment, the total time of the selected digest segments may exceed the specified digest time. If exceeding the specified digest time becomes a problem, necessary measures will be taken against the overtime, such as to share the overtime among the decided digest segments and then eliminate the shared time from the stop time of each digest segment.

Figure 6:
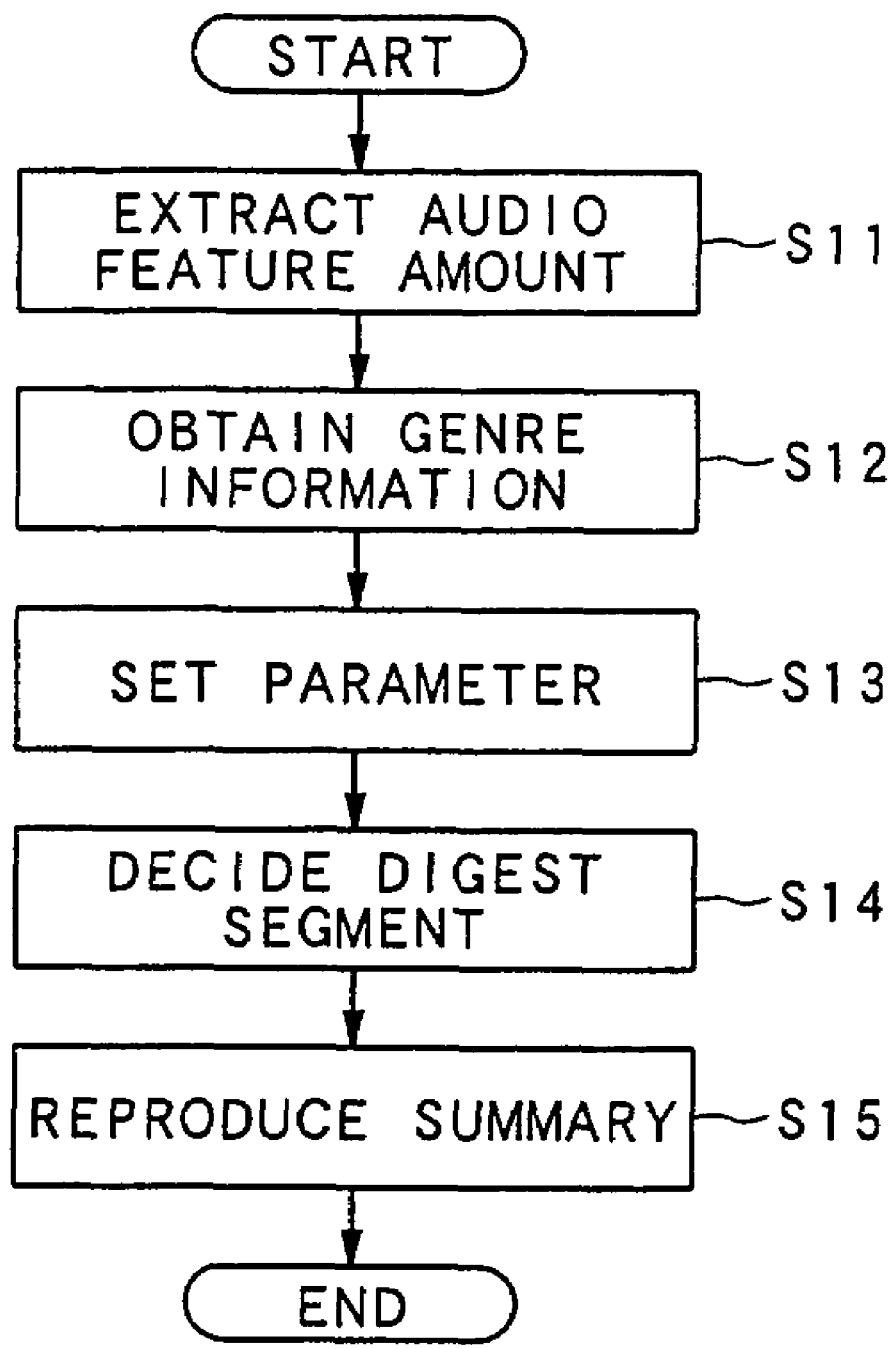
FIG. 6 is a flowchart showing a summary reproducing operation in the embodiment.
Figure 7:
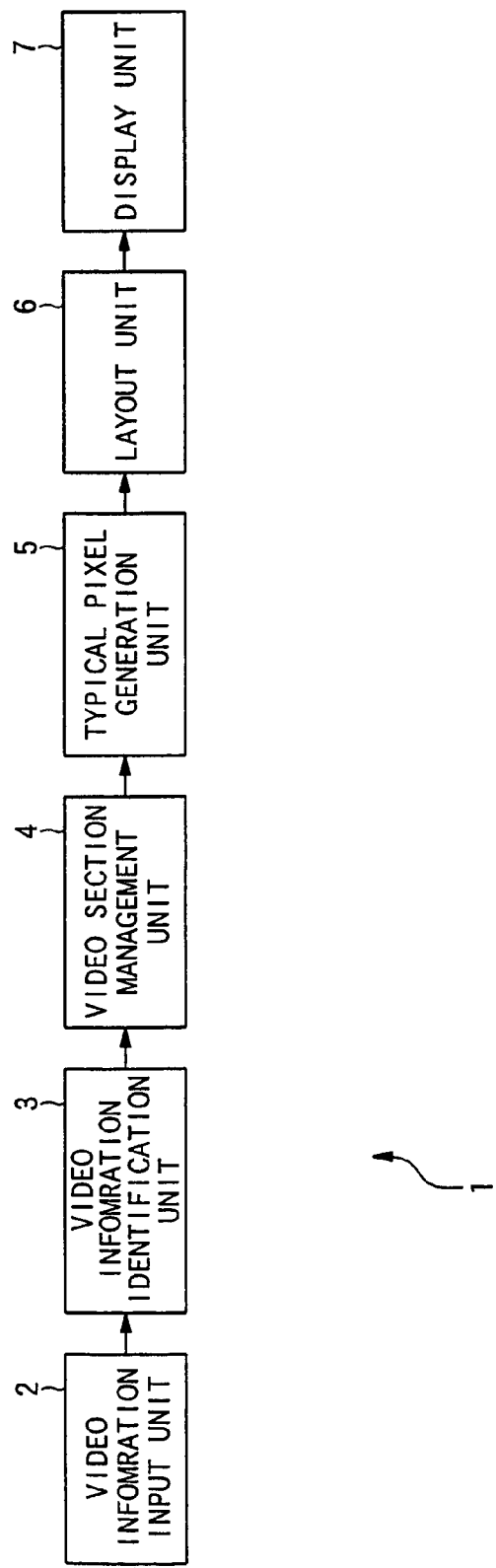
FIG. 7 is a block diagram showing a structure of a conventional summary reproducing apparatus.

The following describes the summary reproducing operation of the embodiment by using FIG. 6.

Referring to FIG. 6, there is shown a flowchart of the summary reproducing operation of this embodiment. Assuming that the audio/video information required for summary reproduction is already stored in the storage unit 104, the operation is carried out when the user instructs the summary reproduction.

First, when the user enters an instruction for summary reproduction by using the operation unit 105, the audio feature amount extraction unit 102 obtains audio feature amounts, that is, a plurality of audio sections on the basis of the preset parameters after an input of the audio information in the audio/video information through the demultiplexer 101 from the storage unit 104 (step S11) and the genre information obtaining unit 105 obtains genre information from the program arrangement information (service information) in the audio/video information through the demultiplexer 101 from the storage unit 104 (obtaining process (step S12)).

Next, the decision parameter setting unit 106 sets an optimum decision parameter by obtaining genre information through the storage unit 104 to output it to the control unit 108 and sets a parameter for use in setting the importance of the digest segments to be extracted on the basis of the genre information (optimization process (step S13)).

Subsequently, the control unit 108 selects audio sections detected based on the parameter matching the decided parameter set by the decision parameter setting section 106 and performs a decision process of the above digest segments on the basis of the selected audio sections and the importance set by the decision parameter setting unit 106 (decision process (Step S14)).

Finally, when the digest segments to be extracted is decided in step 14, the control unit 108 controls the reproduction unit 107 to start summary reproduction and controls the reproduction unit 107 to perform the summary reproduction on the basis of the decided digest segments (generation process (Step S15)).

As described hereinabove, according to the embodiment, since the audio feature amount in deciding the digest segments, in other words, the audio level for detecting the plurality of audio sections used as reference and the importance of each digest segment can be optimized on the basis of the genre information in the audio/video information, the digest segments to be extracted can be extracted accurately even for a different type of the audio/video information and the digest information based on the contents of the audio/video information can be reproduced.

Further, the digest segments to be extracted can be extracted accurately only by optimizing each threshold, thereby enabling an easy decision of the digest segments without a need for changing a decision operation of the digest segments for each type of video information.

In addition, since the partial video information to be extracted can be decided on the basis of the time-base positions of the plurality of audio sections detected, the exciting part of the audio/video information and the part where the contents are switched can be extracted accurately as digest segments, thereby enabling the summary reproduction based on the contents of the audio/video information.

Furthermore, since the importance optimized for each audio section among different audio sections can be set to each digest segment, the digest segments to be extracted can be accurately extracted even for a different type of the audio/video information, thereby enabling the summary reproduction based on the contents of the audio/video information.

While the summary reproduction is performed on the basis of the video information made of digital signals in the embodiment, the present invention is also applicable to the video information such as a TV program.

Furthermore, while the plurality of audio sections are detected on the basis of the preset parameter and the digest segments are decided by selecting audio sections detected by the parameter matching the decision parameter set based on the genre information in the embodiment, it is also possible to optimize the parameter for detecting the audio sections in the audio feature amount extraction unit 102 by using the obtained genre information if the genre information is obtained separately as mentioned above.

Still further, the plurality of audio sections are extracted in advance by using the plurality of parameters and the digest segments are decided on the basis of the audio sections extracted by the appropriate parameter based on the decision parameter set based on the genre information. If, however, the genre information of the audio/video information can be obtained separately from the digital audio/video information, it is also possible to set the decision parameter on the basis of the obtained genre information and to extract the plurality of audio sections on the basis of the decision parameter concerned.

While the summary reproducing operation is performed by the audio feature amount extraction unit 102, the genre information obtaining unit 103, the decision parameter setting unit 106, the reproduction unit 107, and the control unit 108 in the embodiment, it is also possible to execute the summary reproduction by writing the program for performing the summary reproducing operation into the record medium and by reading the program stored in the record medium with a computer.

In this case, the control unit 108 has a computer for executing the program by reading it and the computer is used to extract the audio feature amount, to obtain the genre information, to set the parameter, to decide the digest segment, and to perform the summary reproduction. This results in achieving the same effect as in the above-mentioned summary reproducing apparatus.

(II) Modification

The following describes a modification according to the present invention.

Though summary reproduction is performed by using the noise sections or silent sections on the audio information in the above embodiment, the summary reproduction can be also performed by using scene changes on the video information.

Specifically, first, the above digest reproduction can be performed by detecting scene changes in the video information, and then repeating the reproduction only for a fixed period of time (for example, 10 sec.) with the timing of each of the detected scene changes as a start time.

It should be noted that, however, the scene change detection can be weighted (giving a difference of the importance) to adjust the entire time period necessary for the summary reproduction. Preferably, the importance is decided using a time interval between the scene change and the previous one so as to decide the scene changes to be used for the summary reproduction in descending order of importance. Furthermore, it is also possible to have an arrangement capable of the optimization of the weighing function by using the genre information.

The following describes the above operation more specifically by giving two examples.

[For News Program]

First, the operation will be described by giving an example for a news program.

For wide and shallow browsing through the contents of a news program (in other words, reproducing a summary), it is preferable to select a part following a long scene change interval so as to select as many as news contents for the reproduction. On the other hand, parts following frequent scene changes have almost the same contents. Therefore, determining that a part accompanied by a long scene change interval is of much importance and that a part accompanied by a short scene change interval is of little importance, the importance is preferably decided by using the following arithmetic expression, for example:

$$f(x)=a \times x+b$$

[For Sport Program]

Next, the operation will be described by giving a sport program.

For example, scenes of little importance in the summary reproduction such as a pitching scene in a baseball game broadcasting program or a pass scene in a soccer game broadcasting program are often accompanied by long scene change intervals. On the other hand, scenes of much importance in the summary reproduction such as a hit scene in a baseball game broadcasting program or a goal scene in a soccer game broadcasting program are often accompanied by frequent scene changes such as review reproduction of individual scenes or a zoom up of a target player. Therefore, determining that a part accompanied by a long scene change interval is of little importance and that a part accompanied by a short scene change interval is of much importance, the importance is preferably decided by using the following arithmetic expression, for example:

$$f(x)=(a/x)+b$$

While the summary reproducing apparatus 100 is provided with the genre information obtaining unit 103, the decision parameter unit 106, the reproduction unit 107, and the control unit 108 in the embodiment as mentioned above, it is also possible to provide the control unit 108 with a record medium such as a computer and a hard disk, to store the program for executing the processes corresponding to the components of the summary reproducing apparatus 100 such as the genre information obtaining unit 103, the decision parameter unit 106, the reproduction unit 107, and the control unit 108, and to make the computer read the program so as to perform the operations of the components of the summary reproducing apparatus 100 such as the genre information obtaining unit 103, the decision parameter unit 106, the reproduction unit 107, and the control unit 108.

In this case, the above summary reproduction is performed by getting the computer to work with the stored program. Furthermore, in this case, the control unit 108 is provided with an obtaining device, an optimization device, a setting device, a generation device, and a decision device.

The entire disclosure of Japanese Patent Application Nos. 2001-304360 filed on Sep. 28, 2001 and 2001-216604 filed on Jul. 17, 2001 including the specification, claims, drawings and summary is incorporated herein by reference in its entirety.

What is claimed is:

1. A video information summarizing apparatus for extracting one or more pieces of partial video information as some parts of video information from content information made of audio information and the video information and for generating digest information having a shorter time length of the video information on the basis of the partial video information extracted, the apparatus comprising:

an obtaining device which obtains identification information for identifying a type of the content information;

a decision device which classifies the content information into a plurality of content sections by using optimized thresholds and which decides the partial video information to be extracted on the basis of the classified content section;

an optimization device which sets optimum values to one or a plurality of the thresholds used for classifying the content information into the plurality of content sections on the basis of the obtained identification information; and a generation device which generates the digest information by extracting the decided partial video information from the video information, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

2. A video information summarizing apparatus for extracting one or more pieces of partial video information as some parts of video information from the video information to which audio information is added on the basis of the audio information and for generating digest information having a shorter time length of the video information on the basis of the partial video information extracted, the apparatus comprising:

an obtaining device which obtains identification information for identifying a type of video information externally;

a decision device which classifies the audio information added to the video information into a plurality of audio sections by using optimized thresholds and which decides the partial video information to be extracted on the basis of the classified audio sections;

an optimization device which sets optimum values to one or a plurality of thresholds used for classifying the audio information into the plurality of audio sections on the basis of the obtained identification information; and a generation device which generates the digest information by extracting the decided partial video information from the video information, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

3. The apparatus according to claim 2, wherein
the decision device decides the partial video information to be extracted on the basis of at least a time-base position of at least any one of the plural types of classified audio sections.

4. The apparatus according to claim 2, wherein,
if the identification information shows an identification of video information having silent parts,
the decision device obtains the silent sections at least partially having the silent parts by classifying the audio information and decides the partial video information at least on the basis of the silent sections, and
the optimization device optimizes the thresholds used when the decision device obtains the silent sections.

5. The apparatus according to claim 2, wherein
if the obtained identification information shows an identification of video information having cheer sounds in background noise forming the audio information,
the decision device obtains the cheer sound sections having the cheer sounds by classifying the audio information and decides the partial video information at least on the basis of the cheer sound sections, and
the optimization device optimizes the thresholds used when the decision device obtains the cheer sound sections.

6. A video information summarizing apparatus for extracting one or more pieces of partial video information as some parts of video information from content information made of audio information and the video information and for generating digest information having a shorter time length of the video information on the basis of the partial video information extracted and importance, the apparatus comprising:

an obtaining device which obtains identification information for identifying a type of the content information;

a decision device which classifies the content information into a plurality of content sections on the basis of thresholds in the content information and which decides the partial video information to be extracted on the basis of the classified content sections;

an optimization device which optimizes the importance set to each of the partial video information on the basis of the obtained identification information;

a setting device which sets the optimized importance to each of the partial video information; and a generation device which generates the digest information by extracting the decided partial video information from the video information on the basis of the importance, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

7. A video information summarizing apparatus for extracting one or more pieces of partial video information as some parts of video information from the video information to which audio information is added on the basis of the audio information and for generating digest information having a shorter time length of the video information on the basis of the partial video information extracted and importance, the apparatus comprising:

an obtaining device which obtains identification information for identifying a type of the video information;

a decision device which classifies the video information into a plurality of audio sections on the basis of thresholds in the audio information and which decides the partial video information to be extracted on the basis of the classified sections;

an optimization device which optimizes the importance set to each of the partial video information on the basis of the obtained identification information;

a setting device which sets the optimized importance to each of the partial video information; and a generation device which generates the digest information by extracting the decided partial video information from the video information on the basis of the importance, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

8. The apparatus according to claim 7, wherein if the decision device decides the partial video information to be extracted on the basis of different thresholds, the optimization device optimizes the importance for each of the different thresholds on the basis of the obtained identification information, and the setting device sets the optimized importance to the partial video information.

9. The apparatus according to claim 7, wherein if the obtained identification information shows an identification of video information having silent parts, the decision device obtains silent sections at least partially having silent parts by classifying the audio information and decides the partial video information at least on the basis of the silent sections, and the optimization device optimizes the importance set to the partial video information decided based on the silent sections.

10. The apparatus according to claim 7, wherein if the obtained identification information shows an identification of video information having cheer sounds in background noise forming the audio information, the decision device obtains cheer sound sections having the cheer sounds by classifying the audio information and decides the partial video information at least on the basis of the cheer sound sections, and the optimization device optimizes the importance set to the partial video information set based on the cheer sound sections.

11. A video information summarizing method for extracting one or more pieces of partial video information as some parts of video information from content information made of audio information and the video information and for generating digest information having a shorter time length of the video information on the basis of the partial video information extracted, the method comprising:

an obtaining process for obtaining identification information for identifying a type of the content information;

a decision process for classifying the content information into a plurality of content sections by using optimized thresholds and for deciding the partial video information to be extracted on the basis of the classified content sections;

an optimization process for setting optimum values to the one or more thresholds used for classifying the content information into the plurality of content sections on the basis of the obtained identification information; and a generation process for extracting the decided partial video information from the video information to generate the digest information, wherein, based on whether the time length of partial video information to be extracted is within a range having a minimum time length and a maximum time length, the decision process decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision process decides partial video information having the minimum time length, in a case where the time length of partial video information to be extracted is within the range, the decision process decides original partial video information, and in a case where the time length of partial video information to be extracted is longer than the maximum time length, the decision process decides partial video information having time length within the range.

12. A video information summarizing method for extracting one or more pieces of partial video information as some parts of video information from the video information to which audio information is added on the basis of the audio information and for generating digest information having a shorter time length of the video information on the basis of the partial video information extracted, the method comprising:

an obtaining process for obtaining identification information for identifying a type of the video information;

a decision process for classifying the audio information added to the video information into a plurality of audio sections by using optimized thresholds and for deciding the partial video information to be extracted on the basis of the classified audio sections;

an optimization process for setting optimum values to the one or more thresholds used for classifying the audio information into the plurality of audio sections on the basis of the obtained identification information; and a generation process for extracting the decided partial video information from the video information to generate the digest information, wherein, based on whether the time length of partial video information to be extracted is within a range having a minimum time length and a maximum time length, the decision process decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision process decides partial video information having the minimum time length, in a case where the time length of partial video information to be extracted is within the range, the decision process decides original partial video information, and in a case where the time length of partial video information to be extracted is longer than the maximum time length, the decision process decides partial video information having time length within the range.

13. The method according to claim 12, wherein the decision process is to decide the partial video information to be extracted on the basis of at least the time-base position of at least any one of the plural types of classified audio sections.

14. The method according to claim 12, wherein,
if the obtained identification information shows an identification of video information having silent parts,
the decision process is to obtain the silent sections at least partially having the silent parts when the audio information is classified into the plurality of audio sections and to decide the partial video information at least on the basis of the silent section concerned, and
the optimization process is to optimize the thresholds used for obtaining the silent sections.

15. The method according to claim 13, wherein,
if the obtained identification information shows an identification of video information having cheer sounds in background noise forming the audio information,
the decision process is to obtain the cheer sound sections having the cheer sounds when the audio information is classified into the plurality of audio sections and to decide the partial video information at least on the basis of the cheer sound section concerned, and
the optimization process is to optimize the thresholds used for obtaining the cheer sound sections.

16. A video information summarizing method for extracting one or more pieces of partial video information as some parts of video information from content information made of audio information and the video information and for generating digest information having a shorter time length of the video information on the basis of the partial video information extracted and importance, the method comprising:

an obtaining process for obtaining identification information for identifying a type of the content information;

a decision process for classifying the content information into a plurality of content sections on the basis of thresholds in the content information and for deciding the partial video information to be extracted;

an optimization process for optimizing the importance set to each of the partial video information on the basis of the obtained identification information;

a setting process for setting the optimized importance to each of the partial video information; and a generation process for extracting the decided partial video information from the video information on the basis of the importance to generate the digest information, wherein, based on whether the time length of partial video information to be extracted is within a range having a minimum time length and a maximum time length, the decision process decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision process decides partial video information having the minimum time length, in a case where the time length of partial video information to be extracted is within the range, the decision process decides original partial video information, and in a case where the time length of partial video information to be extracted is longer than the maximum time length, the decision process decides partial video information having time length within the range.

17. A video information summarizing method for extracting one or more pieces of partial video information as some parts of video information from the video information to which audio information is added on the basis of the audio information and for generating digest information having a shorter time length of the video information on the basis of the partial video information extracted, the method comprising:

an obtaining process for obtaining identification information for identifying a type of the video information;

a decision process for classifying the video information into a plurality of audio sections on the basis of thresholds in the audio information and for deciding the partial video information to be extracted on the basis of the classified sections;

an optimization process for optimizing the importance set to each of the partial video information on the basis of the obtained identification information;

a setting process for setting the optimized importance to each of the partial video information; and a generation process for extracting the decided partial video information from the video information on the basis of the importance to generate the digest information, wherein, based on whether the time length of partial video information to be extracted is within a range having a minimum time length and a maximum time length, the decision process decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision process decides partial video information having the minimum time length, in a case where the time length of partial video information to be extracted is within the range, the decision process decides original partial video information, and in a case where the time length of partial video information to be extracted is longer than the maximum time length, the decision process decides partial video information having time length within the range.

18. The method according to claim 17, wherein, if the decision process is to decide the partial video information to be extracted on the basis of the different thresholds, the optimization process is to optimize the importance for each of the different thresholds on the basis of the obtained identification information; and the setting process is to set the optimized importance to the partial video information.

19. The method according to claim 17, wherein, if the obtained identification information shows an identification of video information having silent parts, the decision process is to obtain silent sections at least partially having silent parts when the audio information is classified into the plurality of audio sections and to decide the partial video information on the basis of the silent section concerned, and the optimization process is to optimize the importance set to the partial video information decided based on the silent sections.

20. The method according to claim 17, wherein if the obtained identification information shows an identification of video information having cheer sounds in background noise forming the audio information, the decision process is to obtain cheer sound sections having cheer sounds when the audio information is classified into the plurality of the audio sections and to decide the partial video information on the basis of the cheer sound section concerned, and the optimization process is to optimize the importance set to the partial video information decided based on the cheer sound sections.

21. A computer-readable medium encoded with a software program, the software program being a video information summarizing program and the computer-readable medium being a recording medium which is configured to be read by a computer in a video information summarizing apparatus for extracting one or more pieces of partial video information as some parts of video information from content information made of audio information and the video information and to generate digest information having a shorter time length of the video information on the basis of the partial video information extracted, wherein the program causes the computer to function as:

an obtaining device which obtains identification information for identifying a type of the content information;

a decision device which classifies the content information into a plurality of content sections by using optimized thresholds and which decides the partial video information to be extracted on the basis of the classified content section;

an optimization device which sets optimum values to one or more of the thresholds for use in classifying the content information into the plurality of content sections on the basis of the obtained identification information; and a generation device which generates the digest information by extracting the decided partial video information from the video information, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

22. A computer-readable medium encoded with a software program, the software program being a video information summarizing program and the computer-readable medium being a recording medium which is configured to be read by a computer in a video information summarizing apparatus for extracting one or more pieces of partial video information as some parts of video information on the basis of audio information from the video information to which the audio information is added and to generate digest information having a shorter time length of the video information on the basis of the partial video information extracted, wherein the program causes the computer to function as:

an obtaining device which obtains identification information for identifying a type of the video information externally;

a decision device which classifies the audio information added to the video information into a plurality of audio sections by optimized thresholds and for deciding the partial video information to be extracted on the basis of the classified audio sections;

an optimization device which sets optimum values to one or more thresholds on the basis of the obtained identification information used when the audio information is classified into the plurality of audio sections; and a generation device which generates the digest information by extracting the decided partial video information from the video information, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

23. The computer-readable medium encoded with a software program according to claim 22, wherein the decision device decides the partial video information to be extracted on the basis of at least a time-base position of at least any one of the plural types of audio sections classified in the video information.

24. The computer-readable medium encoded with a software program according to claim 22, wherein, if the obtained identification information shows an identification of video information having silent parts, the decision device obtains the silent sections at least partially having the silent parts by classifying the audio information and for deciding the partial video information at least on the basis of the silent sections; and the optimization device optimizes the thresholds used when said decision means obtains the silent sections.

25. The computer-readable medium encoded with a software program according to claim 22, wherein, if the obtained identification information shows an identification of video information having cheer sounds in background noise forming the audio information, the decision device obtains the cheer sound sections having the cheer sounds by classifying the audio information and for deciding the partial video information at least on the basis of the cheer sound sections; and the optimization device optimizes the thresholds used when said decision means obtains the cheer sound sections.

26. A computer-readable medium encoded with a software program, the software program being a video information summarizing program and the computer-readable medium being a recording medium which is configured to be read by a computer in a video information summarizing apparatus for extracting one or more pieces of partial video information as some parts of video information from content information made of audio information and the video information and to generate digest information having a shorter time length of the video information on the basis of the partial video information extracted and importance, wherein the program causes the computer to function as:

an obtaining device which obtains identification information for identifying a type of the content information;

a decision device which classifies the content information into a plurality of content sections on the basis of thresholds in the content information and for deciding the partial video information to be extracted on the basis of the classified content sections;

an optimization device which optimizes the importance set to each of the partial video information on the basis of the obtained identification information;

a setting device sets the optimized importance to each of the partial video information; and a generation device which generates the digest information by extracting the decided partial video information from the video information on the basis of the importance, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

27. A computer-readable medium encoded with a software program, the software program being a video information summarizing program and the computer-readable medium being a recording medium which is configured to be read by a computer in a video information summarizing apparatus for extracting one or more pieces of partial video information as some parts of video information on the basis of audio information from the video information to which the audio information is added and to generate digest information having a shorter time length of the video information on the basis of the partial video information extracted and importance, wherein the program caused the computer to function as:

an obtaining device which obtains identification information for identifying a type of the video information;

a decision device which classifies the video information into a plurality of audio sections on the basis of thresholds in the audio information and for deciding the partial video information to be extracted on the basis of the classified sections;

an optimization device which optimizes the importance set to each of the partial video information on the basis of the obtained identification information;

a setting device which sets the optimized importance to each of the partial video information; and a generation device which generates the digest information by extracting the decided partial video information from the video information on the basis of the importance, wherein, based on whether the time length of partial video information to be extracted is within a range having a minimum time length and a maximum time length, the decision device decides one of original partial video information, partial video information having the minimum time length, and partial video information having time length within the range, wherein the minimum time length and the maximum time length are based on a total time length of the digest information to be generated, and wherein in a case where the time length of partial video information to be extracted is shorter than the minimum time length, the decision device decides partial video information having the minimum time length, in a case where the time length of partial video information to be extracted is within the range, the decision device decides original partial video information, and in a case where the time length of partial video information to be extracted is longer than the maximum time length, the decision device decides partial video information having time length within the range.

28. The computer-readable medium encoded with a software program according to claim 27, wherein, if the decision device decides the partial video information to be extracted on the basis of different thresholds, the optimization device optimizes the importance for each of the different thresholds on the basis of the obtained identification information; and the setting device sets the optimized importance to the partial video information.

29. The computer-readable medium encoded with a software program according to claim 27, wherein, if the obtained identification information shows an identification of video information having silent parts, the decision device obtains silent sections at least partially having silent parts by classifying the audio information and for deciding the partial video information at least on the basis of the silent sections; and the optimization device optimizes the importance set to the partial video information decided based on the silent sections.

30. The computer-readable medium encoded with a software program according to claim 27, wherein, if the obtained identification information shows an identification of video information having cheer sounds in background noise forming the audio information, the decision device obtains cheer sound sections having the cheer sounds by classifying the audio information and for deciding the partial video information at least on the basis of the cheer sound sections; and the optimization device optimizes the importance set to the partial video information set based on the cheer sound sections.

* * * * *